United States Patent
Yamazaki et al.

(10) Patent No.: US 12,394,245 B2
(45) Date of Patent: Aug. 19, 2025

(54) DETERMINING IF AN EVENT RELATES TO AN UNAUTHORIZED SUBJECT

(71) Applicant: NEC Corporation, Tokyo (JP)

(72) Inventors: Satoshi Yamazaki, Singapore (SG); Hui Lam Ong, Singapore (SG); Hong Yen Ong, Singapore (SG); Xinlai Jiang, Singapore (SG)

(73) Assignee: NEC CORPORATION, Tokyo (JP)

( * ) Notice: Subject to any disclaimer, the term of this patent is extended or adjusted under 35 U.S.C. 154(b) by 556 days.

(21) Appl. No.: 17/789,980

(22) PCT Filed: Dec. 25, 2020

(86) PCT No.: PCT/JP2020/048800
§ 371 (c)(1),
(2) Date: Jun. 29, 2022

(87) PCT Pub. No.: WO2021/140966
PCT Pub. Date: Jul. 15, 2021

(65) Prior Publication Data
US 2023/0037546 A1    Feb. 9, 2023

(30) Foreign Application Priority Data

Jan. 7, 2020 (SG) .............................. 10202000146S

(51) Int. Cl.
*G06V 40/16* (2022.01)
*G06V 20/52* (2022.01)
(Continued)

(52) U.S. Cl.
CPC ............ *G06V 40/173* (2022.01); *G06V 20/52* (2022.01); *G06V 40/103* (2022.01); *G06V 40/50* (2022.01); *G06V 2201/07* (2022.01)

(58) Field of Classification Search
CPC .... G06V 40/173; G06V 20/52; G06V 40/103; G06V 40/50; G06V 2201/07; G06F 18/23
See application file for complete search history.

(56) References Cited

U.S. PATENT DOCUMENTS 10,225,518 B2 * 3/2019 Hodge ................. G06V 40/172
10,769,415 B1 * 9/2020 Mostafa ............... G06V 10/993
(Continued)

FOREIGN PATENT DOCUMENTS

JP       2002352291 A  * 12/2002  ......... G06K 9/00288
JP       2005-214682 A     8/2005
(Continued)

OTHER PUBLICATIONS

JP Office Action for JP Application No. 2022-540778, mailed on Jul. 25, 2023 with English Translation.
(Continued)

*Primary Examiner* — Vu Le
*Assistant Examiner* — Jack Peter Kraynak

(57) ABSTRACT

Present disclosure provides a method for determining if an event relates to an unauthorized subject, the method comprising: determining a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject; and determining the event to relate to the unauthorized subject in response to the determination of the likelihood.

10 Claims, 13 Drawing Sheets

(a) Retrieve data belonging to a same subject identifier (b) Add unauthorized subject identifiers to events with matching score lower than matching threshold (c) Propagate authorized and unauthorized subject identifiers through subject identifier propagation

(51) Int. Cl.
*G06V 40/10* (2022.01)
*G06V 40/50* (2022.01)

(56) References Cited

U.S. PATENT DOCUMENTS

2013/0266193 A1\* 10/2013 Tiwari .................... G06F 18/23
                                                              382/115
2018/0018861 A1\*  1/2018 Locke .................. H04N 13/204
2018/0047274 A1\*  2/2018 Miwa ................. G07C 9/00571

FOREIGN PATENT DOCUMENTS

| JP | 2012-181629 A | | 9/2012 | |
|---|---|---|---|---|
| JP | 2019153986 A | \* | 9/2019 | |
| WO | 2015/166612 A1 | | 11/2015 | |
| WO | 2017/006749 A1 | | 1/2017 | |
| WO | 2017/029718 A1 | | 2/2017 | |
| WO | WO-2019230275 A1 | \* | 12/2019 | ........... G06F 16/532 |

OTHER PUBLICATIONS

JP Official Communication for Japanese Patent Application No. 2023-188143, mailed on Jul. 16, 2024 with English Translation.
International Search Report for PCT Application No. PCT/JP2020/048800, mailed on Apr. 6, 2021.
English translation of Written opinion for PCT Application No. PCT/JP2020/048800, mailed on Apr. 6, 2021.

\* cited by examiner

DETERMINING IF AN EVENT RELATES TO AN UNAUTHORIZED SUBJECT

This application is a National Stage Entry of PCT/JP2020/048800 filed on Dec. 25, 2020, which claims priority from Singapore patent application 10202000146S filed on Jan. 7, 2020, the contents of all of which are incorporated herein by reference, in their entirety.

TECHNICAL FIELD

The present disclosure relates to a method and an apparatus for determining if an event relates to an unauthorized subject.

BACKGROUND ART

Video analytic for subject identification and recognition has become increasingly popular in recent years. By utilizing algorithms and processing hardware, a video footage can be processed to obtain data for identifying a subject in the video footage. Face recognition is one of the video analytic technologies that is widely used in subject identification. Currently, it has been adopted in public safety solution to assist in law enforcement's investigation, authentication method for e-commerce transaction payment and contactless identity recognition in physical access authorization. In particular, majority of face recognition solutions determining an event of a subject appearance based on facial information obtained from a video footage or an image as data identifying the subject, match the facial information identifying the subject against facial information identifying a known or authorized subject, and if both facial information are highly correlated, determining the event to relate to the known or authorized subject. In various embodiments, an authorized subject may be one who has the permission to enter a premise or has previously entered the premise and is determined to be unlikely to pose a threat.

An unauthorized subject detection system can be implemented through face recognition technology based on the concept of comparing data identifying an unauthorized subject with data identifying an authorized subject. For example, if the data identifying the unauthorized subject do not match with the data identifying the authorized subject, an event may be determined to relate to the unauthorized subject. Such unauthorized subject detection system can be useful for detecting potential intruder for example when the intruder or an unauthorized subject enters a premise.

SUMMARY OF INVENTION

Technical Problem

However, some of the limitations and challenges in accuracy of conventional video analytic technologies may get amplified and hinder the application of such video analytic technology into unauthorized subject detection. In particular, conventional video analytic technology may not be able to generate a consistent outcome based on detections of a subject detected under varying environmental or imaging conditions. Under such limitations of accuracy, an alert is immediately generated and provided to the user once there is a possibility of detecting an unauthorized subject. A conventional technique typically does not hold an event (an instruction/a signal) to generate an alert, or determine an event to relate to an unauthorized subject based on the determination of another event relating to an authorized subject and/or an unauthorized subject. In short, there is no technique in conventional technologies to minimize alerts that are not supposed to be generated. Therefore, it is an object of present disclosure to substantially overcome the existing challenges as discussed above to determine if an event relates to an unauthorized subject.

An object of the present disclosure is to provide a method and an apparatus to minimize alerts that are not supposed to be generated.

Solution to Problem

According to a first aspect of the present disclosure, there is provided a method for determining if an event relates to an unauthorized subject, the method comprising: determining a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject; and determining the event to relate to the unauthorized subject in response to the determination of the likelihood.

According to a second aspect of the present disclosure, there is provided an apparatus for determining if an event relates to an unauthorized subject, the apparatus comprising: a memory in communication with a processor, the memory storing a computer program recorded therein, the computer program being executable by the processor to cause the apparatus at least to: determine a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject; and determine the event to relate to the unauthorized subject in response to the determination of the likelihood.

According to yet another aspect of the present disclosure, there is provided a system for determining if an event relates to an unauthorized subject, the system comprising the apparatus in the second aspect and at least one image capturing device.

Advantageous Effects of Invention

According to the present invention, it can be achieved to provide a method and an apparatus which overcome or at least partially alleviate the above issues.

BRIEF DESCRIPTION OF DRAWINGS

The accompanying figures, where like reference numerals and characters refer to identical or functionally similar elements throughout the separate views and which together with the detailed description below are incorporated in and form part of the specification, serve to illustrate various embodiments and to explain various principles and advantages in accordance with present embodiments in which.

DESCRIPTION OF EMBODIMENTS (Overview)

Figure 1:
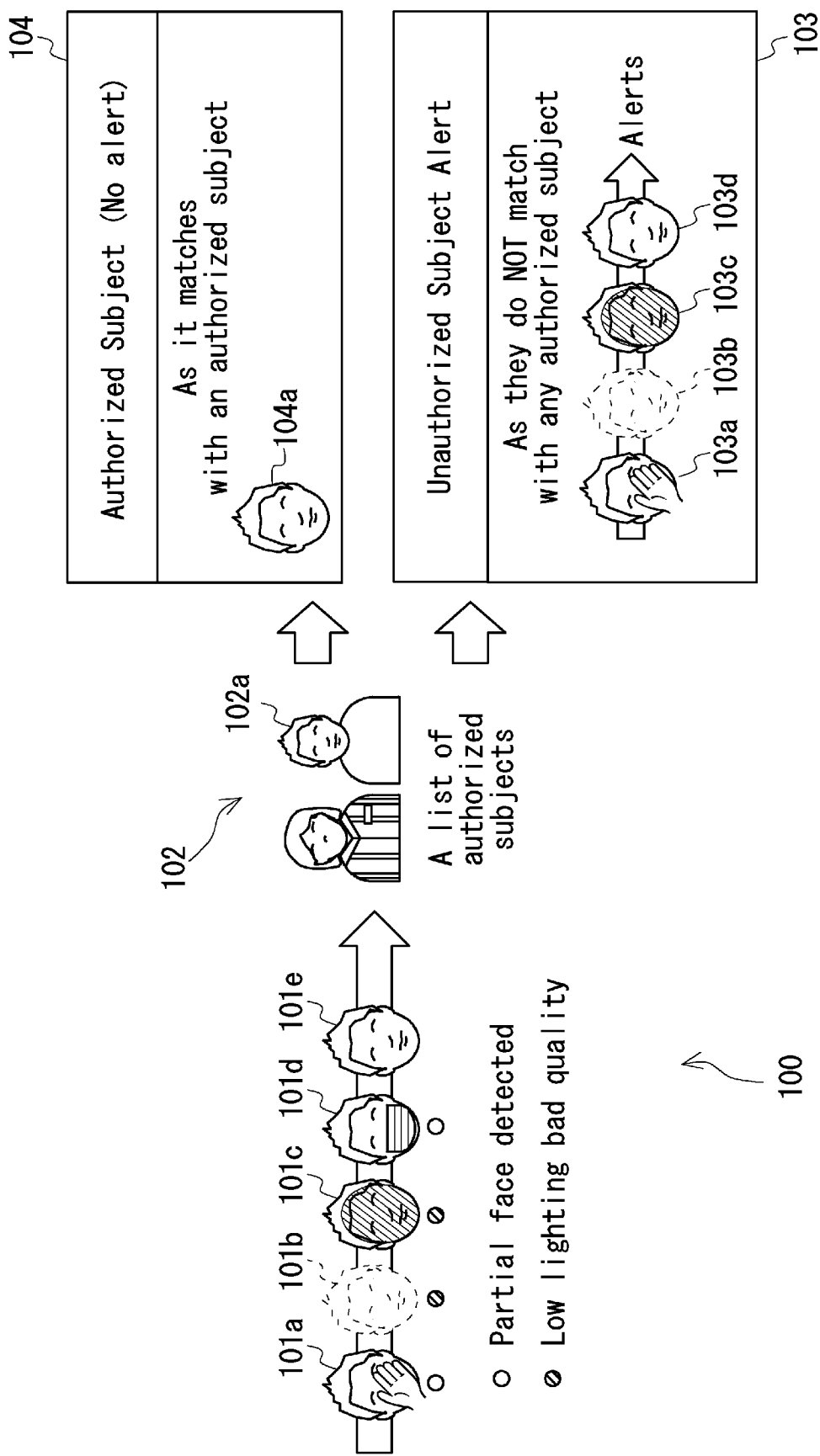
FIG. 1 depicts a system for determining if an event relates to an unauthorized subject based on images input according to an embodiment.

Data identifying a subject-data identifying a subject may refer to information that is associated with or used to identify a subject based on the subject's attribute or characteristic information. The attributes or characteristic information can be a physical characteristic of a subject such as height, body size, hair colour, skin colour, facial information, apparel, belongings, other similar characteristics or combinations, or a behavioral characteristic of a subject such as body movement, position of limbs, direction of movement, moving speed, the way the subject walks, stands, moves, talks, other similar characteristics or combinations, or other attributes or characteristic information. In various embodiments below, data identifying a subject can be obtained from an input such as an image of an imaging capturing device. A portion of data identifying a subject can be used a subject identifier (subject ID), such that a subject can be identified by the computer system or similar electronic device based on the subject identifier. For example, a subject identifier can be generated based on facial information. Different facial information may generate two different subject identifiers such that the computer system or similar electronic device refers them as appearances of two different subjects, whereas similar facial information may be assigned with a single subject identifier such that the computer system or similar electronic device refers them as appearances of a single subject.

Event—an event refers to a signal, an instruction or an action, which is generated, triggered, handled or recognized by a computer system or similar electronic device. An event refers to a detection of an appearance of a subject based on an input during a specific time period. Each event identified from the input during the specific time period is determined if it relates to an authorized subject or an unauthorized subject based on its data identifying the subject obtained from the input and data identifying an authorized subject retrieved from a database. In various embodiments below, events that are determined to relate to an authorized subject will be aggregated in a list of events relating to the authorized subject, whereas events that are determined to relate to an unauthorized subject will be aggregated in a list of events relating to the unauthorized subject.

Authorized subject—an authorized subject refers to a subject of a list of subjects who have the permission to enter a premise or have previously entered the premise and are determined to be unlikely to pose a threat. In various embodiments below, data identifying the authorized subject are retrieved from a database of a computer system or similar electronic device for (i) determining if an event relates to the authorized subject and (ii) calculating a matching score of an event.

Unauthorized subject—an unauthorized subject is a subject who is not an authorized subject or any subject in a list of authorized subjects. In various embodiments below, a subject whose appearance is identified based on the input during the specific time period may be viewed as an unauthorized subject, and the corresponding event identified based on the subject appearance will be detected if it relates to an unauthorized subject.

Matching score—a matching score is calculated by comparing data identifying an unauthorized subject obtained from the received input against data identifying an authorized subject retrieved from the database, referring to a degree of how closely both the data identifying the unauthorized subject and the data identifying the authorized subject correspond to each other. A matching score may be scaled from 0% to 100%, where a matching score of 0% indicates that both the data identifying the unauthorized subject and the data identifying the authorized subject have no correlation or no characteristic information in common, whereas a matching score of 100% indicates that both the data identifying the unauthorized subject and the data identifying the authorized subject are fully correlating and identical to each other. In an embodiment where an event is matched against a list of authorized subjects and a corresponding plurality of matching scores are calculated by comparing the data identifying the unauthorized subject against data identifying each of the list of authorized subjects, the highest matching score among the plurality of matching scores will be selected as the matching score of the event.

First matching threshold—a first matching threshold refers to an unauthorized subject matching threshold which set a maximum matching score for an event to be determined as being related to an unauthorized subject. An event with a matching score lower than the first matching threshold is determined to relate to the unauthorized subject and assigned with an unauthorized subject identifier corresponding to the unauthorized subject. In various embodiments below, an event with an unauthorized subject identifier (unauthorized subject ID) is required to initiate a subject identifier propagation process and used for assigning an event with the unauthorized subject identifier.

Second matching threshold—a second matching threshold refers to an authorized subject matching threshold which set a minimum matching score for an event to be determined as being related to the authorized subject. The second matching threshold is higher than the first matching threshold. An event with a matching score higher than the second matching threshold is determined to relate to the authorized subject and assigned by an authorized subject identifier (authorized subject ID) corresponding to the authorized subject. In various embodiments below, an event with an authorized subject identifier is required to initiate a subject identifier propagation process and used for assigning an event with the authorized subject identifier.

Non-identified event—a non-identified event is an event that has been assigned with a subject ID upon detecting the appearance of the subject but has not been assigned with an unauthorized subject ID or an authorized subject ID. Specifically, a non-identified event has a matching score higher than the unauthorized subject matching threshold and lower than the authorized subject matching threshold, indicating the data identifying the unauthorized subject based on the input has moderate degree of correlation with the data identifying the authorized subject retrieved from the database. In various embodiments below, non-identified events may be retrieved and determined if they relate to an authorized subject or unauthorized subject, and assigned with authorized subject ID or unauthorized subject ID correspondingly through a subject identifier propagation process. A newly assigned event will then be aggregated to the corresponding list of events relating to the authorized subject or the unauthorized subject. In some embodiments, a non-identified event may be determined as noise and may not be assigned with an authorized subject ID or an unauthorized subject ID if it fails to relate to the authorized subject or the unauthorized subject through the subject identifier propagation process.

EXEMPLARY EMBODIMENTS

Embodiments of the present disclosure will be better understood and readily apparent to one of ordinary skill in the art from the following written description, which provides examples only, and in conjunction with the drawings.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "retrieving", "determining", "replacing", "generating", "initializing", "outputting", "receiving", "identifying", "predicting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and display presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the internet system, or wireless medium such as exemplified in the GSM mobile telephone system. The computer program when loaded and executed on such as computer effectively results in an apparatus that implements the steps of the preferred method.

According to various embodiments below, an image capturing device may be used to capture an image comprising a subject. The subject can be identified as appearing in the image based on characteristic information such as appearance, facial information, height, hair colour, movement or other similar characteristic information, or combination. Upon identifying the subject based on the image input, an event comprising data identifying the subject such as the characteristic information is detected. Subsequently, a matching process is carried out by matching data identifying the subject against data identifying each subject of a list of authorized subjects to detect if the event relates to an authorized subject. If, based on the result of the matching process indicating that the subject does not match with any authorized subject in the list of authorized subjects, it is then determined that the event does not relate to an authorized subject. As a result, an alert may be generated indicating a detection of the unauthorized subject is detected.

FIG. 1 depicts a system 100 for determining if an event relates to an unauthorized subject based on images input according to an embodiment. A subject is detected in five images 101a-101e under different conditions based on facial information of the subject in each image, as such five corresponding events comprising facial information of the subject are detected. Each event is determined if the event relates to an authorized subject by matching the subject against a list of authorized subjects 102 based on facial information of the subject of the event. In this embodiment, the image 101e may be captured under a normal condition where the subject facial information is clear and complete. In such condition, the subject identified from the image 101e can match with an authorized subject 102a in the list of authorized subjects 102, and as a result, it is determined that the event relates to the authorized subject 102a, as indicated in 104a, and an alert may not be generated (104).

In contrast, the images 101a, 101d may be captured under a condition where the subject facial information is partially detected. In such condition, the subject identified from the images 101a, 101d could not match with any authorized subject in the list of authorized subjects 102, and as a result, it is determined that the events do not relate to an authorized subject, as indicated in 103a, 103d, and the events 103a, 103d may be used to generate an alert (103). Similarly, the image 101b, 101c may be detected under a condition where the subject face is unclear due to low lighting and bad quality condition. In such condition, the subject identified from the images 101b, 101c could not match with any authorized subject in the list of authorized subjects 102, and as a result, it is determined that the events do not relate to an authorized subject, as indicated in 103b, 103c, and the events 103b, 103c may be used to generate an alert (103). Such alerts are falsely generated due to varying conditions under which the images of a same subject were taken. Therefore, it is an object of the present disclosure to manage such events and minimize an alert that is not supposed to be generated by determining if an event relates to an unauthorized subject prior to generating the alert.

Figure 2:
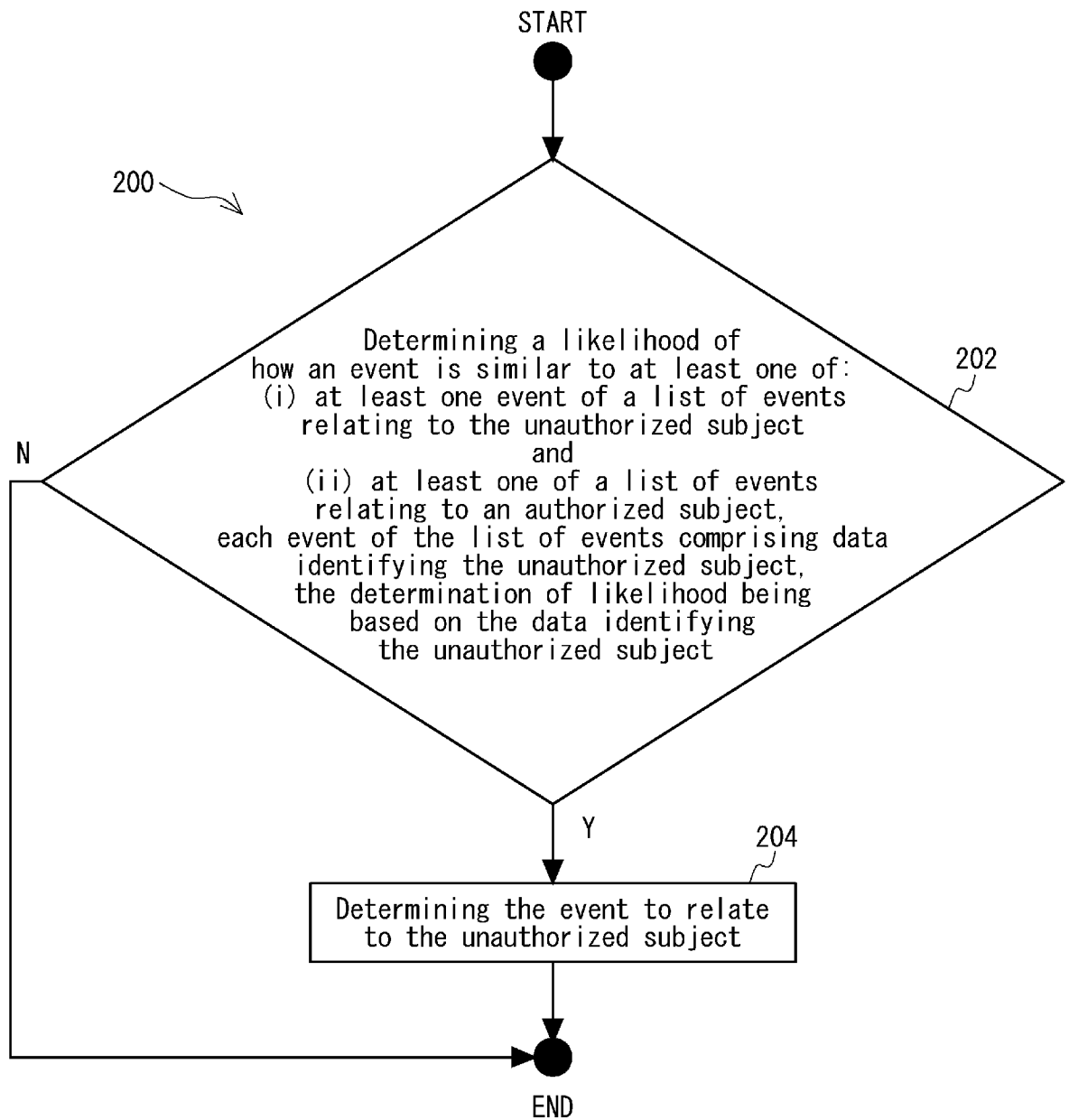
FIG. 2 shows a flow chart illustrating a method for determining if an event relates to an unauthorized subject according to an embodiment.

Various embodiments provide apparatus and methods for determining if an event relates to an unauthorized subject. FIG. 2 shows a flow chart illustrating a method 200 for determining if an event relates to an unauthorized subject according to an embodiment. At step 202, the method comprises a step of determining a likelihood of how an event is similar to at least one of: (i) at least one event of a list of events relating to the unauthorized subject and (ii) at least one of a list of events relating to an authorized subject, each event of the list of events comprising data identifying the authorized subject, the determination of likelihood being based on the data identifying the unauthorized subject. At step 204, the method comprises a step of determining the event to relate to the unauthorized subject in response to the determination of the likelihood.

According to an embodiment, at step 202, the method may comprise a step of receiving an input, the input being at least one image captured by at least one image capturing device during a specific time period, wherein the determination of the event and each event of the list of events comprising the data identifying the unauthorized subject is based on the received input. In particular, an event is detected when an appearance of an unauthorized subject is identified from the input during the specific time period, the event comprising data identifying the unauthorized subject obtained from the received input. Similarly, more than one events may be detected when more than one appearances of the unauthorized subject are determined based on the received input during the specific time period, each of the more than one event comprising respective data identifying the unauthorized subject obtained from the received input.

According to an embodiment, at step 202, the method may further comprise a step of calculating a matching score of each event of the list of event based on data identifying the unauthorized subject, the matching score referring to a degree of correlation between the data identifying the unauthorized subject and data identifying the authorized subject. The method may further comprise a step of determining if an event of the list of events relating to the unauthorized subject has a matching score lower than a first matching threshold, i.e. unauthorized subject matching threshold, the matching score lower than the first matching threshold indicating that the event of the list of events relates to the unauthorized subject. According to the present disclosure, at least one event of the list of events relating to the unauthorized subject has a matching score lower than the first matching threshold. The method may comprise a step of assigning the at least one event with an unauthorized subject identifier (unauthorized subject ID) and based on the at least one event, forming the list of events relating to the unauthorized subject.

According to an embodiment, at step 202, the method may further comprise a step of determining if an event of the list of events relating to the authorized subject has a matching score higher than a second matching threshold, i.e. authorized subject matching threshold, the matching score higher than the second matching threshold indicating that the event of the list of events relates to the authorized subject. According to the present disclosure, at least one event has matching score higher than the second matching threshold. The method may comprise a step of assigning the at least one event with an authorized subject identifier (authorized subject ID) and based on the at least one event, forming the list of events relating to the authorized subject.

According to an embodiment, at step 202, the method may further comprise a step of calculating a matching score of the event based on data identifying the unauthorized subject, and a step of determining if the matching score of the event is higher than the first matching threshold and lower than the second matching threshold. In various embodiments, events with matching score higher than the first matching threshold and lower than the second matching threshold may refer to a non-identified event, and may be retrieved and will be assigned with an authorized subject ID or unauthorized subject ID through steps 202 and 204. In particular at step 204, the method may comprise a step of determining a non-identified event relates to the unauthorized subject in response to determining the likelihood of how the non-identified event is similar to the at least one event of the list of event relating to the unauthorized subject higher than the likelihood of how the non-identified event is similar to the at least one event of the list of event relating to the unauthorized subject. As such, the method may then further comprise a step of assigning the non-identified event with an unauthorized subject ID and adding this newly assigned event in the list of events with the unauthorized subject ID relating to the unauthorized subject.

According to an embodiment, at step 204, the method may comprise a step of determining the non-identified event to relate to the authorized subject in response to determining the likelihood of how the event is similar to the at least one event of the list of event relating to the authorized subject higher than the likelihood of how the event is similar to the at least one event of the list of event relating to the unauthorized subject. As such, the method may then further comprise a step of assigning the non-identified event with an authorized subject ID and adding this newly assigned event in the list of events with the authorized subject ID relating to the authorized subject.

According to an embodiment, at step 204, the method may further comprise a step of updating the data identifying the authorized subject to comprise the data identifying the unauthorized subject of each event of the list of events relating to the authorized subject. The updated data identifying the authorized subject may be used for calculating matching score of a subsequent event identified based on the input of a subsequent time period and determining if the subsequent event relates to an unauthorized subject.

Figure 3:
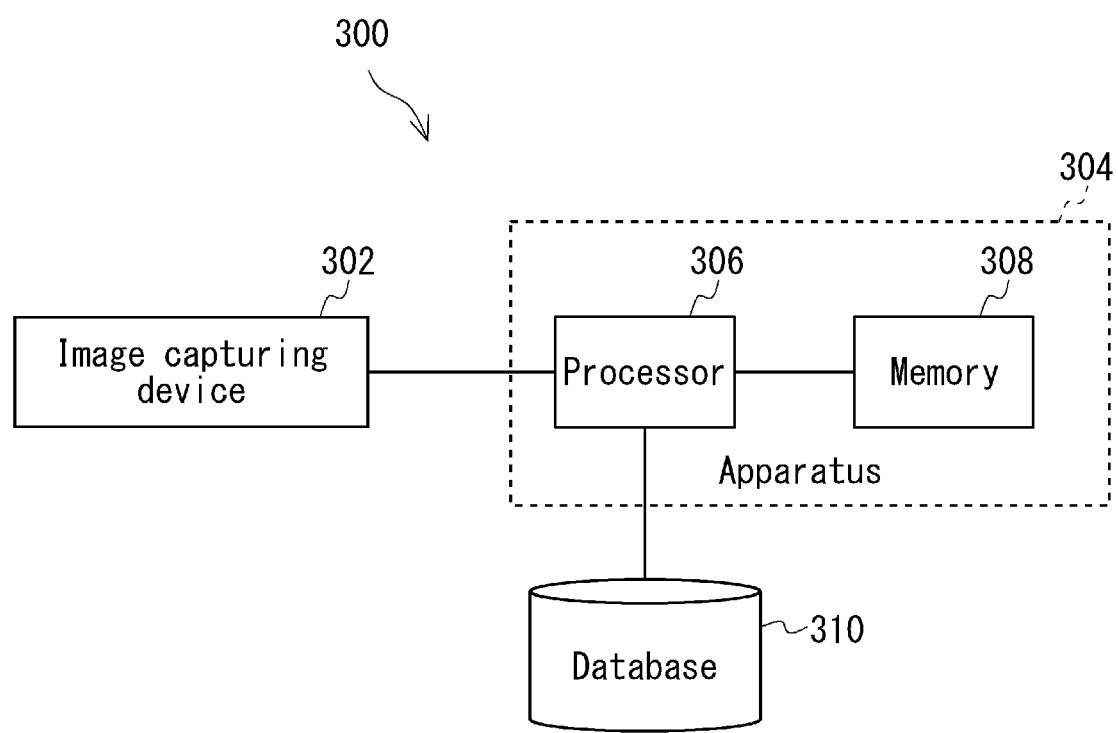
FIG. 3 depicts a block diagram illustrating a system for determining if an event relates to an unauthorized subject according to an embodiment.

FIG. 3 depict a block diagram illustrating a system 300 for determining if an event relates to an unauthorized subject according to an embodiment. In an example, the managing of input is performed by at least an image capturing device 302. The system 300 comprises an image capturing device 302 in communication with the apparatus 304. In an implementation, the apparatus 304 may be generally described as a physical device comprising at least one processor 306 and at least one memory 308 including computer program code. The at least one memory 308 and the computer program code are configured to, with the at least one processor 306, cause the physical device to perform the operations described in FIG. 2. The processor 306 is configured to receive an image from the image capturing device 302 or to retrieve image from a database 310.

The image capturing device may be a device such as closed-circuit television (CCTV), web-cams, surveillance camera, or other similar devices, which provide a variety of information of which characteristic information and time information that can be used by the system to identify a subject and obtain data identifying the subject. In an implementation, the characteristic information derived from the image capturing device 302 for identifying a subject and obtaining data identifying the subject may include physical characteristic information such as height, body size, hair colour, skin colour, facial feature, apparel, belongings, other similar characteristic or combinations, or behavioral characteristic information such as body movement, position of limbs, direction of movement, the way of a subject walks, stands, moves and talks, other similar characteristic or combination. For example, facial information may be used to identify a subject while other characteristic information associated with the subject may be obtained and aggregated as data identifying the subject, and stored in memory 308 of the apparatus 304 or a database 310 accessible by the apparatus 304. In an implementation, the time information derived from the image capturing device and/or sensor 302 may be include timestamp at which each image or data is identified. The timestamps of images and data may be stored in memory 308 of the apparatus 304 or a database 310 accessible by the apparatus 304 to identify an event referring to an appearance of a subject and aggregate with the characteristic information of the subject as data identifying the subject such that the event can be searched and retrieved based on time information. It should be appreciated that the database 310 may be a part of the apparatus 304.

The apparatus 304 may be configured to communicate with the imaging capturing device 302 and the database 310. In an example, the apparatus 304 may receive, from the image capturing device, or retrieve from the database 310, an image as input, and after processing by the processor 306 in apparatus 304, identify an appearance of an unauthorized subject and data identifying the unauthorized subject, and generate an output such as an event comprising the data identifying the unauthorized subject which may be used for determining if the event relates to the unauthorized subject. During the specific time period, more than one events may be detected if more than one appearances of the unauthorized subject are identified based on the input of one or more images captured from the image capturing device 302 or the database 310, and each of the more than one event comprising respective data identifying the unauthorized subject obtained based on the input and is determined if the event relates to the unauthorized subject.

In various embodiments below, after receiving an image from the image capturing device 302, or retrieving an image from the database 310, the memory 308 and the computer program code stored therein are configured to, with the processor 306, cause the apparatus 304 to determine a likelihood of how the event is similar to at least one of: (i) at least one event of a list of events relating to the unauthorized subject and (ii) at least one event of a list of events relating to an authorized subject, each event of the list of events comprising data identifying the unauthorized subject, the determination of likelihood being based on the data identifying the unauthorized subject of the event based on the image; and determine the event to relate to the unauthorized subject in response to the determination of the likelihood.

The apparatus 304 may be further configured to calculate a matching score of each event of the list of events based on data identifying the unauthorized subject obtained from the image input; and determine if an event of the list of events relating to the unauthorized subject has a matching score lower than a first matching threshold, i.e. unauthorized subject matching threshold, the matching score lower than the first matching threshold indicating that the event of the list of events relates to the unauthorized subject. According to the present disclosure, the apparatus 304 may be configured to determine at least one event of the list of events relating to the unauthorized subject having a matching score lower than the first matching threshold, and assign the at least one event of the list of events with an unauthorized subject ID. Each event of the list of events with the unauthorized subject ID relating to the unauthorized subject is stored in the database 310 and is retrieved for unauthorized subject detection and subject identifier propagation process.

The apparatus 304 may be further configured to determine if an event of the list of events relating to the authorized subject has a matching score higher than a second matching threshold, i.e. authorized subject matching threshold, wherein the second matching threshold is higher than the first matching threshold, the matching score higher than the second matching threshold indicating the event of the list of events relates to the authorized subject. According to the present disclosure, the apparatus 304 may be configured to determine at least one event of the list of events relating to the authorized subject having a matching score higher than the second matching threshold, and assign the at least one event of the list of events with an authorized subject ID corresponding to the authorized subject. Each event of the list of events with the authorized subject ID relating to the authorized subject is stored in the database 310 and is retrieved for unauthorized subject detection and subject identifier propagation process.

The apparatus 304 may be further configured to calculate a matching score of the event based on data identifying the unauthorized subject; and determining if the matching score of the event is higher than the first matching threshold, and lower than the second matching threshold. In various embodiments, such event may be retrieved from the database 310 as a non-identified event and processed by the processor 306 in apparatus 304 to determine if the non-identified event relates to an unauthorized subject. In particular, the apparatus 304 may be configured to, in response to determine the likelihood of how the non-identified event is similar to the at least one event of the list of event relating to the unauthorized subject higher than the likelihood of how the non-identified event is similar to the at least one event of the list of event relating to the authorized subject, determine the non-identified event to relate to the unauthorized subject, assign the non-identified event with the unauthorized subject ID and add this newly assigned event in the list of events relating to the unauthorized subject.

According to another embodiment, the apparatus 304 may be configured to, in response to determine the likelihood of how the non-identified event is similar to the at least one event of the list of event relating to the authorized subject higher than the likelihood of how the non-identified event is similar to the at least one event of the list of event relating to the unauthorized subject, determine the non-identified event to relate to the authorized subject, assign the non-identified event with the authorized subject ID and add this newly assigned event in the list of events relating to the authorized subject.

The apparatus 304 may be further configured to update the data identifying the authorized subject in the database 310 with the data identifying the unauthorized subject of each event of the list of events relating to the authorized subject. The apparatus 304 may be configured to retrieve such updated data identifying the authorized subject and used the updated data for calculating of matching score of a subsequent event identified based on an input of a subsequent time period and determining if the subsequent event relates to an unauthorized subject.

Figure 4:
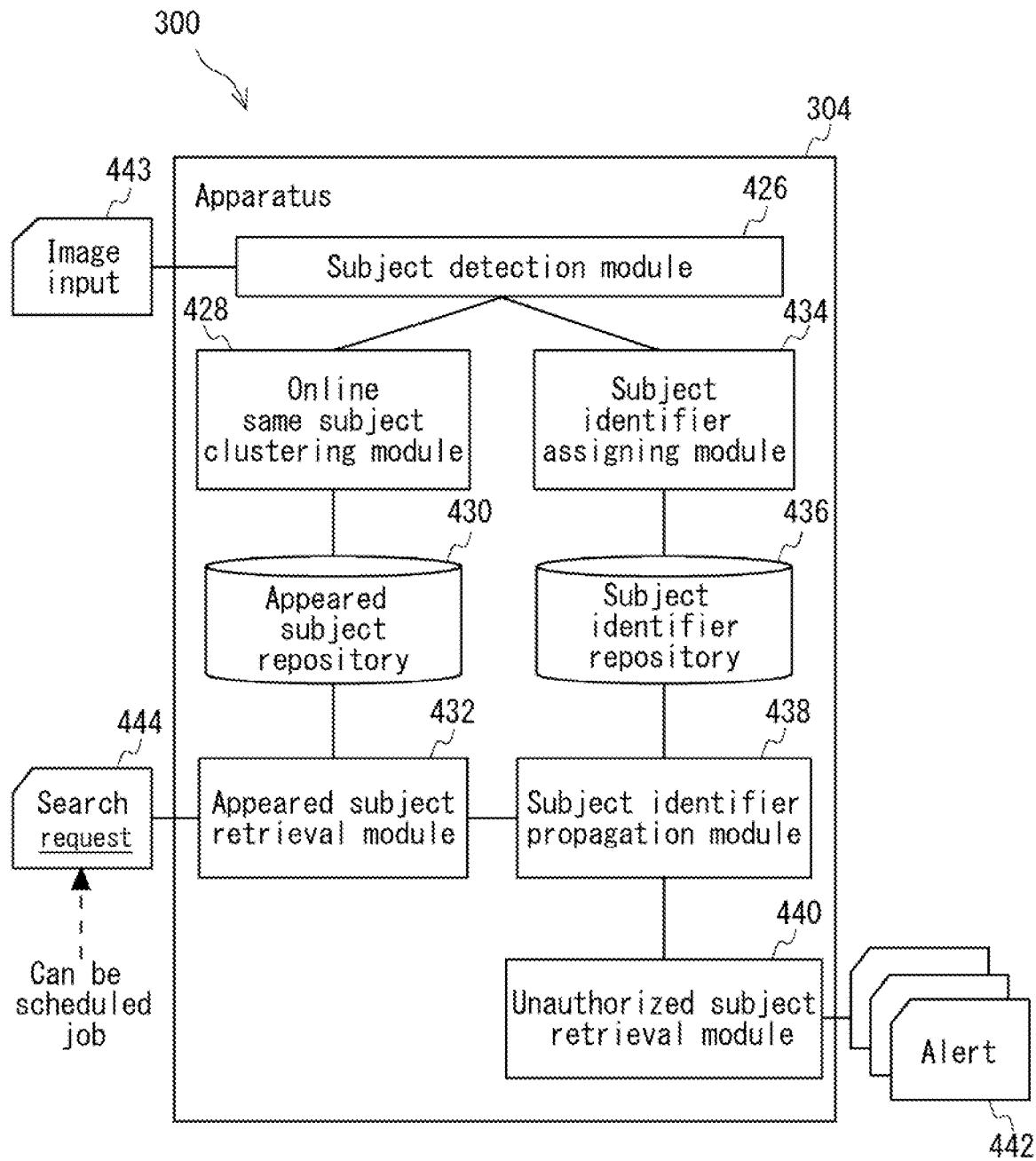
FIG. 4 depicts a block diagram illustrating the system of FIG. 3 according to an embodiment.

FIG. 4 depicts the system 300 with more details. In this embodiment, the apparatus 304 may comprise a subject detection module 426, an online same subject clustering module 428, appeared subject repository 430, appeared subject retrieval module 432, subject identifier assigning module 434, subject identifier repository 436, subject identifier propagation module 438 and unauthorized subject retrieval module 440. The subject detection module 426 of the apparatus 304 is configured to receive images for identifying an appearance of an unauthorized subject and detect an event comprising data identifying the unauthorized subject based on an image input 443 during a specific time period. The online same subject clustering module 428 is configured to receive events from the subject detection module 426 and search for events with similar appearances or data identifying the unauthorized subject detected based on the input and assigned a subject identifier (subject ID) to events with similar appearances. Each appearance will be assigned to a subject ID and stored in the appeared subject repository 430. More information regarding the process of online same subject clustering will be discussed in FIG. 10. An example implementation of the appeared subject repository 430 is shown in table 1. It should be appreciated that the appeared subject repository 430 may be implemented as part of the memory 308 or a database 310 within the apparatus 304 as shown in FIG. 3. The appeared subject retrieval module 432 is configured to retrieve events of a specific time period assigned with the subject ID from the appeared subject repository 430 for further analysis such as subject identifier propagation. In an embodiment, a search request 444 is used to signal the appeared subject retrieval module 432 to retrieve the events of the specific time period for further analysis. In another embodiment, the signaling to the appearance generated by the search request can be scheduled such that the retrieval of events is carried out at a specific time or after every specific time period for further analysis.

The subject identifier assigning module 434 is configured to receive events from the subject detection module 426, and determine if an event relates to an authorized subject based on appearance or data identifying the unauthorized subject obtained from the image input 443. In response to determining the event to relate to an authorized subject, the subject identifier assigning module 434 is configured to assign the event with an authorized subject ID corresponding to the authorized subject. In an embodiment, the subject identifier assigning module 434 may be configured to calculate a matching score by matching data identifying the unauthorized subject obtained from the image input 443 against data identifying the authorized subject retrieved from database 310, determine the event to relate to the authorized subject based on the matching score exceeding the second matching threshold, i.e. authorized subject matching threshold and assign an authorized subject ID corresponding to the authorized subject. In another embodiment, where there is a list of authorized subjects in the database 310, the subject identifier assigning module 434 may be configured to calculate a corresponding plurality of matching scores by comparing the data identifying the unauthorized subject against data identifying each of the list of authorized subjects in the database 310, and if more than one matching scores exceed the second matching threshold, the subject identifier assigning module 434 may be configured to select the authorized subject who provides the highest matching score among the plurality of matching scores, assign an authorized subject ID corresponding to the authorized subject such that the event relates to the authorized subject of the highest matching score. An example implementation of subject identifier repository 436 is shown in table 2. It should be appreciated that the subject identifier repository 436 may be implemented as part of the memory 308 or a database 310 within the apparatus 304 as shown in FIG. 3.

According to the present disclosure, the subject identifier assigning module 434 may also be configured to determine if an event relates to an unauthorized subject based on appearance or data identifying the unauthorized subject obtained from the image input 443. In response to determining the event to relate to the unauthorized subject, the subject identifier assigning module 434 is configured to assign the event with an unauthorized subject identifier corresponding to the unauthorized subject. Similarly, the subject identifier assigning module 434 may be configured to determine the event to relate to the unauthorized subject based on a matching score of the event, in particular, the matching score falling below the first matching threshold, i.e. unauthorized subject matching threshold, wherein the second matching threshold is higher than the first matching threshold. In an embodiment, when two or more events have a matching score falling below the first matching threshold, the two or more events will be assigned with a same unauthorized subject identifier, and they will be aggregated to a list of event relating to the unauthorized subject.

The subject identifier propagation module 438 is configured to perform subject identifier propagation process based on the input of events with authorized subject ID and the input of events with subject IDs detected during a specific time period from subject identifier repository 436 and appeared subject retrieval module 432 respectively. According to the present disclosure, the subject identifier propagation module 438 may be configured to assign each non-identified event of the subject IDs with the authorized subject ID or the unauthorized subject ID by determining a likelihood on how the non-identified event is similar to the identified events. The unauthorized subject retrieval module 440 is configured to retrieve events relating to the unauthorized subject with the unauthorized subject ID and non-identified events, if any, to generate alerts 442 indicating the detection of the unauthorized subject. Examples of implementation of subject identifier propagation module 438 and unauthorized subject retrieval module 440 are plotted in tables 3 and 4 respectively.

In an example implementation of the system 300, according to tables 1 to 4, an event is detected by subject detection module 426 based on subject appearances through facial information obtained from image input 443 of two image capturing devices, i.e. cameras 1 and 2. The eight events corresponding to eight subject appearances are indicated as data ID (face ID) 1 to 8 respectively. Based on the similarity in the appearances, the eight events can be assigned to two subject identifiers (subject IDs 1 and 2) corresponding to two different detected subjects by online same subject clustering module 428 and stored in appeared subject repository 430, as shown in table 1 together with respective locations characterized by the camera from which the image was captured and time indicating the timestamp in which the image was captured. A table 1 is an example implementation of an appeared subject person repository.

TABLE 1

| Data ID (face ID) | Subject ID | Location | Time |
|---|---|---|---|
| 1 | 1 | Camera 1 | 10:00:00 AM, 28 Dec. 2019 |
| 2 | 2 | Camera 1 | 11:00:40 AM, 28 Dec. 2019 |
| 3 | 1 | Camera 1 | 11:05:20 AM, 28 Dec. 2019 |
| 4 | 1 | Camera 1 | 11:05:21 AM, 28 Dec. 2019 |
| 5 | 2 | Camera 2 | 12:15:10 AM, 28 Dec. 2019 |
| 6 | 2 | Camera 2 | 12:15:16 AM, 28 Dec. 2019 |
| 7 | 2 | Camera 2 | 12:15:23 AM, 28 Dec. 2019 |
| 8 | 1 | Camera 2 | 12:16:00 AM, 28 Dec. 2019 |

On the other hand, each event is processed by the subject identifier assigning module 434 to determine if the event relate to an authorized subject based on its data identifying the subject. In this example, events of Data IDs 2 and 6 under subject ID 2 are determined to relate to an authorized subject Yamazaki and therefore assigned with an authorized subject ID corresponding to the authorized subject. The events are stored in subject identifier repository 436 with the information of authorized subject ID, as shown in table 2. In an embodiment, the determination of an event relating to an authorized subject is based on a matching score of the event by matching data identifying the subject obtained from the image input 443 against data identifying the authorized subjects, e.g. Yamazaki, in the database 310, the matching score exceeding the authorized subject matching threshold. In this example, the other 2 events under subject ID 2, i.e. Data IDs 5 and 7, has a matching score not exceeding the authorized subject matching threshold, hence events of Data IDs 5 and 7 are not assigned with the authorized subject ID of Yamazaki and the events remain non-identified in the processing of the subject identifier assigning module 434. Similarly, none of the events under subject ID 1 comprises data that match data identifying any of the authorized subject or a matching score exceeding the authorized subject matching threshold. As a result, the events under subject ID 1 are not assigned with any authorized subject ID and remain non-identified in the processing of the subject identifier assigning module 434. A table 2 is an example implementation of a subject identifier repository.

TABLE 2

| Data ID (face ID) | Authorized subject ID |
|---|---|
| 1 | — |
| 2 | Yamazaki |
| 3 | — |
| 4 | — |
| 5 | — |
| 6 | Yamazaki |
| 7 | — |
| 8 | — |

Additionally or alternatively, each event may be determined to relate to the unauthorized subject based on a matching score falling below the unauthorized subject matching threshold. In this example, event of Data ID 7 under subject ID 2 has a matching score falling below the unauthorized subject matching threshold, hence event of Data ID 7 are assigned with an unauthorized subject ID. The event may be stored in the subject identifier repository 436 with the unauthorized subject ID information (not shown in table 2).

Upon triggered by a search request 444, the appeared subject retrieval module 432 may retrieve events under a subject ID, e.g. events of Data IDs 2, 5, 6 and 7 under subject ID 2, and send to subject identifier propagation module 438. Subject identifier propagation module 438 then perform subject identifier propagation process based on the events retrieved from the appeared subject retrieval module 432 and authorized/unauthorized subject ID information obtained from the subject identifier repository 436 by determining a likelihood of how a non-identified event, e.g. events of Data ID 5, is similar to the event with the authorized subject ID, e.g. events of Data IDs 2 and 6 relating to the authorized subject Yamazaki, and/or the event with the unauthorized subject ID, e.g. event Data ID 7. In this example, it is determined that the likelihood of how the non-identified event is similar to the event with the authorized subject ID is higher than the likelihood of how the non-identified event is similar to the event with the unauthorized subject ID, and as a result, event of Data ID 5 is determined to relate to the authorized subject and assigned with the authorized subject ID, as illustrated in table 3. In an embodiment, the determination of likelihood may be based on its matching score, in particular, how close is the matching score between the non-identified event to the identified events. In this example, event of Data ID 5 may have a matching score closer to that of event of Data ID 2 or 6 than that of event of Data ID 7, therefore the authorized subject ID of event of Data ID 2 or 6 is assigned to the event of Data ID 5. According to various embodiments, the events with authorized subject ID will be aggregated to form a list of event relating to the authorized subject. Likewise, events with unauthorized subject ID will be aggregated to form a list of events relating to the unauthorized subject. In this example, after the event of Data ID 5 is determined to relate to the authorized subject and assigned with the authorized subject ID, the event of Data ID 5 will be added to a list of events relating to the authorized subject comprising the events of Data IDs 2, 5 and 6. A table 3 is an example implementation of a subject identifier propagation module.

TABLE 3

| Data ID (face ID) | Authorized subject ID | Identifier type |
|---|---|---|
| 2 | Yamazaki | Authorized subject ID |
| 5 | — | Authorized subject ID |
| 6 | Yamazak i | Authorized subject ID |
| 7 | — | Unauthorized subject ID |

According to the present disclosure, in order for subject identifier propagation module 438 to operate and initiate subject identifier propagation process, the system requires the retrieved events under the subject ID to have at least one event that has been assigned with the authorized subject ID and at least one event that has been assigned with the unauthorized subject ID. In this regard, as none of the events under subject ID 1 is assigned with an authorized subject ID in the processing of the subject identifier assigning module 434, subject identifier propagation module 438 may not be able to perform subject identifier propagation process on the events under subject ID 1. As a result, events of Data IDs 1, 3, 4 and 8 under subject ID 1 may remain non-identified in the processing of subject identifier propagation module 438.

After the subject identifier propagation process, the non-identified events and events with unauthorized subject ID, namely events of Data IDs 1, 3, 4, 7 and 8, are retrieved by unauthorized subject retrieval module 440, as shown in table 4. Each of the non-identified events or events with unauthorized subject ID may generate an alert 442 to indicate a detection of an unauthorized subject. A table 4 is an example implementation of an unauthorized subject retrieval module.

Figure 5:
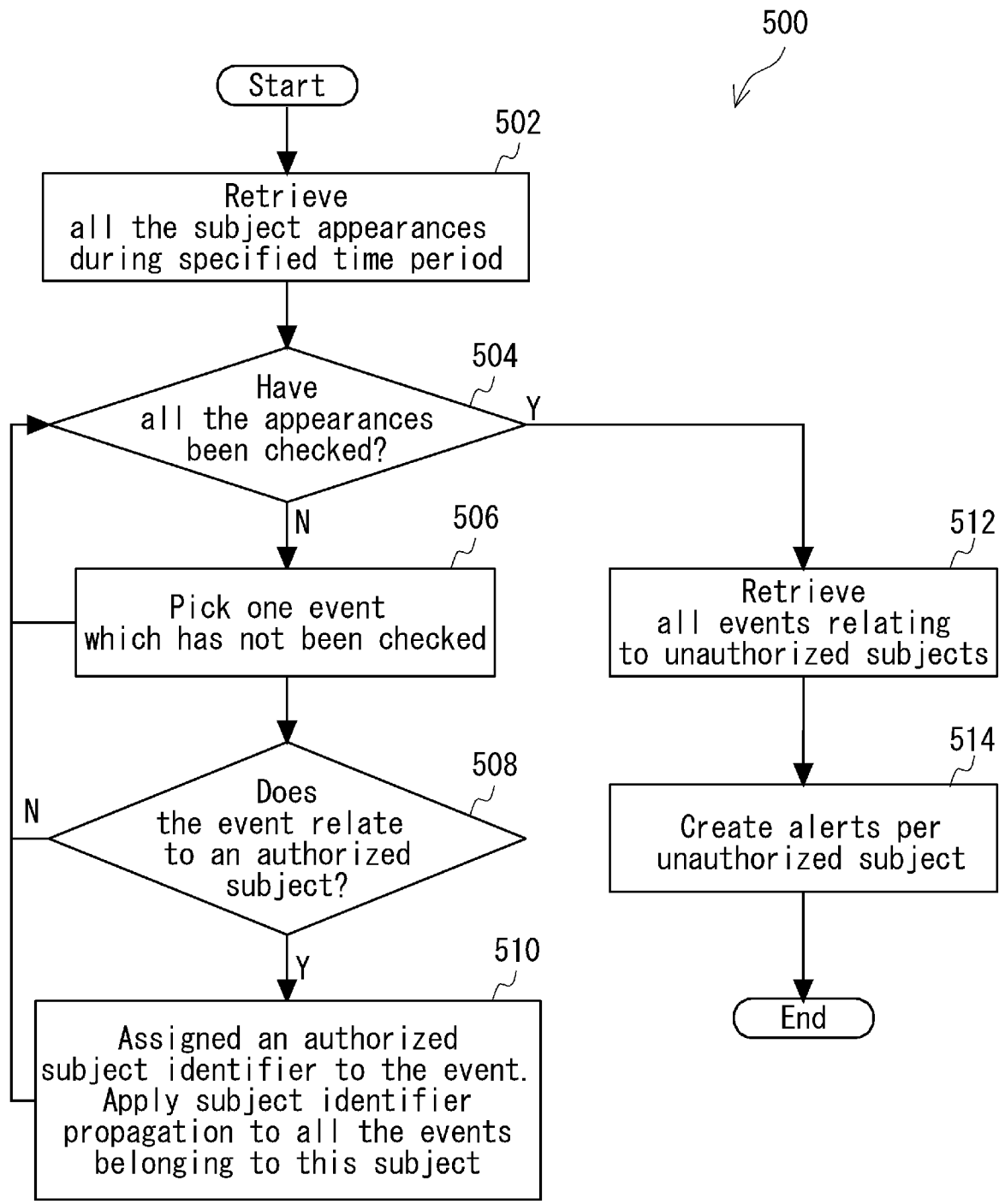
FIG. 5 depict a flow chart illustrating a process of non-identified subject retrieval according to an embodiment.

FIG. 5 depict a flow chart 500 illustrating a process of unauthorized subject retrieval according to an embodiment. Prior to the retrieving events with unauthorized subject ID, at step 502, all events corresponding to all subject appearances and subject IDs during a specific time period are retrieved. At step 504, it is determined if all the events have been checked. In an embodiment, an event is determined as checked if the event has been assigned a subject ID, or has been determined if a matching score of the event is higher or lower than the first matching threshold and/or the second matching threshold for example by online same subject clustering module 428, and stored in the appeared subject repository 430. If all the events are not been checked, step 506 is carried out. At step 506, an event which has not been checked is picked up and processed by the online same subject clustering module 428. At step 508, it is determined if the event relates to an authorized subject, i.e. its matching score is higher than the second matching threshold. If it is relates to an authorized subject, step 510 is carried out. At step 510, the event is assigned with an authorized subject ID corresponding to the authorized subject. The process then further comprises applying subject identifier propagation to all events belonging to the subject, i.e. under the same subject ID. In an embodiment, prior to applying subject identifier propagation to all the events belonging to the subject, the process may comprise determining at least one of all events belonging to this subject to relate to an unauthorized subject, i.e. determining its matching score being lower than the first matching threshold and assigning it with an unauthorized subject ID. In the subject identifier propagation process, all events belonging to the subject will be assigned with an authorized subject ID or an unauthorized subject ID. More information on the process and method of subject identifier propagation will be discussed in FIGS. 6, 7 and 8 in the following.

TABLE 4

| Data ID (face ID) | Subject ID | Location | Time |
| --- | --- | --- | --- |
| 1 | 1 | Camera 1 | 10:00:00 AM, 28 Dec. 2019 |
| 3 | 1 | Camera 1 | 11:05:20 AM, 28 Dec. 2019 |
| 4 | 1 | Camera 1 | 11:05:21 AM, 28 Dec. 2019 |
| 7 | 2 | Camera 2 | 12:15:23 AM, 28 Dec. 2019 |
| 8 | 1 | Camera 2 | 12:16:00 AM, 28 Dec. 2019 |

Returning to step 508, if the event does not relate to an authorized subject, the process is directed to step 504. In an embodiment, as a result of subject identifier propagation process, events with the authorized subject ID are aggregated to a list of events relating to the authorized subject, whereas event with the unauthorized subject ID are aggregated to a list of events relating to the unauthorized subject. Returning to step 504, if all the events with all subject IDs have been checked, the process of non-identified subject retrieval is carried out at step 512 to retrieve all events with unauthorized subject ID. Subsequently, for every list of event assigned under an unauthorized subject ID relating to an unauthorized subject, an alert is generated to indicate the detection of the unauthorized subject at step 514, and the process may end.

Figure 6:
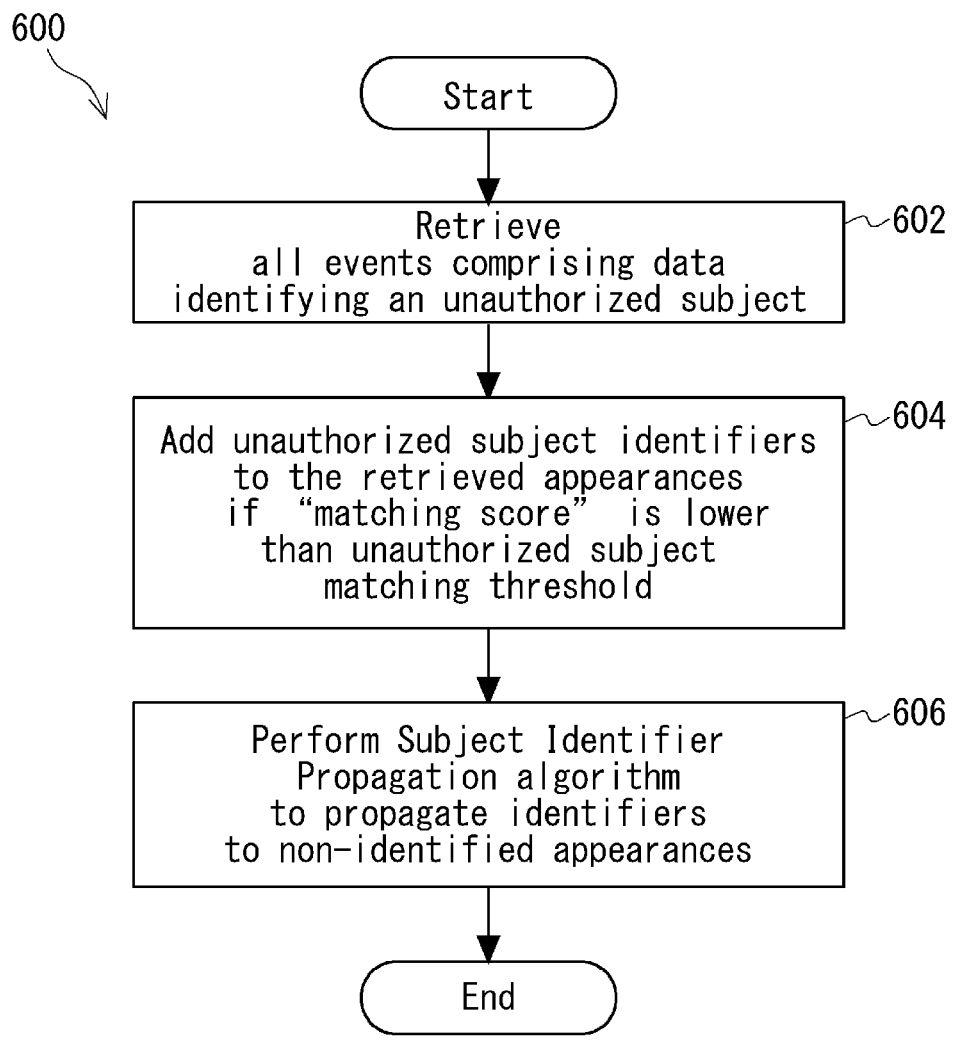
FIG. 6 depicts a flow chart illustrating a process of subject identifier propagation according to an embodiment.

FIG. 6 depicts a flow chart 600 illustrating a process of subject identifier propagation according to an embodiment. Prior to performing the subject identifier propagation, at step 602, all events comprising data identifying a subject, e.g. subject ID 1, are retrieved. At step 604, if one or more event has a matching score lower than the first matching threshold, i.e. unauthorized subject matching threshold, an unauthorized subject ID is assigned to the one or more event. At step 606, a subject identifier propagation algorithm is performed to assign the unauthorized subject ID or the authorized subject ID, to all non-identified events. In case where a non-identified event is determined as noise, the event will not be assigned to the unauthorized subject ID or the authorized subject ID and will remain non-identified.

Figure 7:
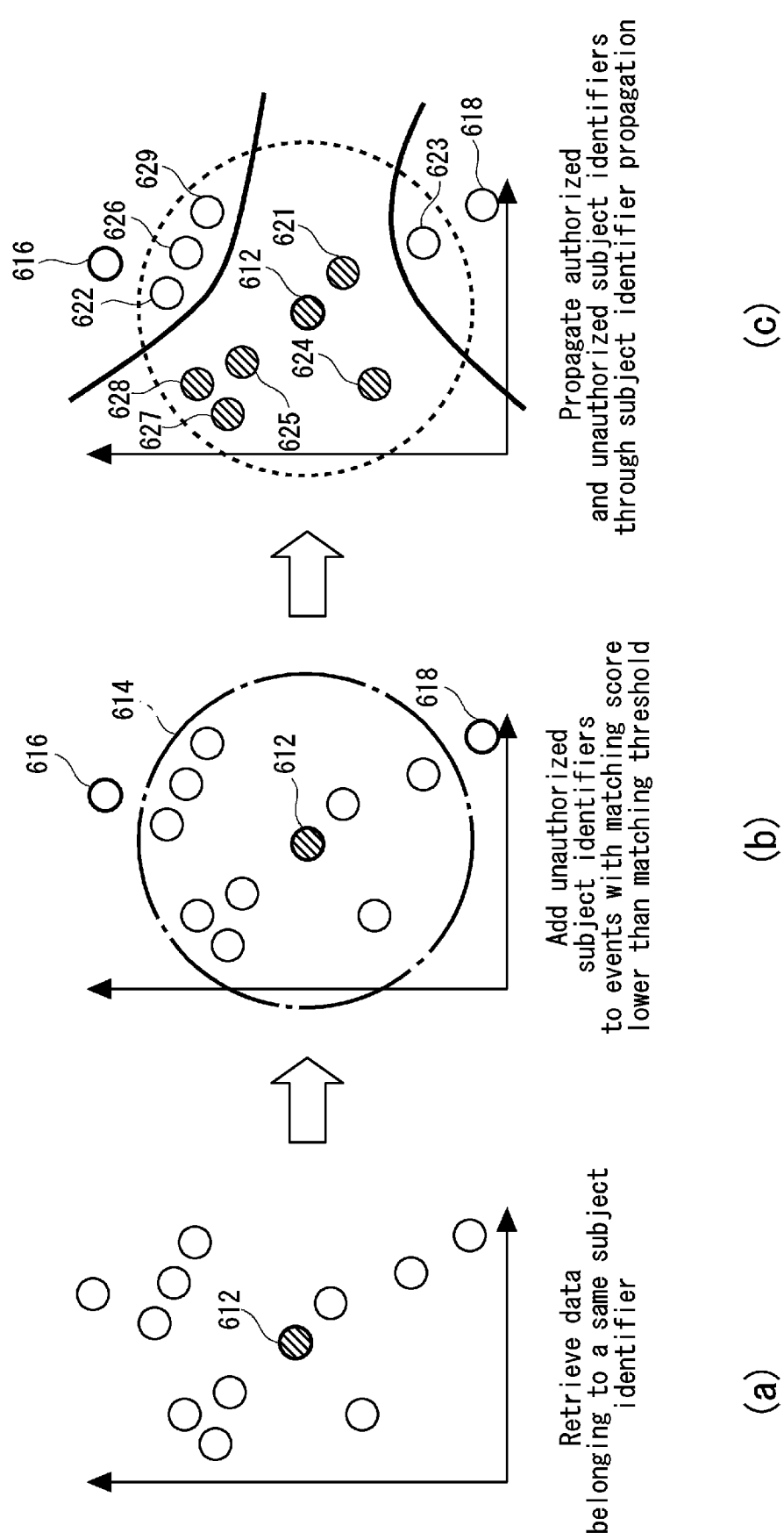
FIG. 7 depicts diagrams illustrating the flow chart of FIG. 6.

FIG. 7 depicts diagrams illustrating the flow chart 600 of the process of subject identifier propagation. Specifically, FIG. 7(a) shows a graph containing a total of 12 events comprising data identifying a subject, e.g. subject ID 1, identified during a specific time period based on appearances of the subject. The axes of the graph may be related to matching score, where events with similar data identifying the subject or similar matching score may be plotted closer to each other in the graph, whereas events with dissimilar data identifying the subject or different matching score may be plotted further apart from each other in the graph. In an embodiment, an event among the 12 events may be determined to relate to an authorized subject, for example, it has a matching score higher than the second matching threshold as a result of matching its data identifying the subject against data identifying the authorized subject. Such event like event 612 is assigned with an authorized subject ID as shown in FIG. 7(a). In an embodiment, the event 612 with the authorized subject ID may be used as a centre point of the graph, where events comprising similar data identifying the subject to that of event 612 is plotted closer to the event 612 whereas events comprising dissimilar data identifying the subject will be plotted further to the event 612 and closer to the edge of the graph.

FIG. 7(b) illustrates a step of assigning unauthorized subject ID to an event which has a matching score lower than the first matching threshold. In this embodiment, a circle 614 may be used to represent the first matching threshold, wherein an event falling outside the circle 614 is characterized as having a matching score lower than the first matching threshold (circle 614), for example events 616 and 618. As a result, events 616 and 618 will be assigned with the unauthorized subject ID.

FIG. 7(c) illustrates a subject identifier propagation process. During the subject identifier propagation process, for each identified event such as events 612, 616 and 618, a neighbouring event search may be conducted to search for neighbouring events comprising similar data identifying the subject. If a neighbouring event is a non-identified event, the non-identified event may be assigned with the ID of the identified event; as a result, the ID is propagated to the neighbouring event. In particular, due to the similarity in data identifying the subject, an event that is adjacent or close to an identified event has a greater likelihood to be determined to relate to the identified event and assigned with the ID of the identified event in the subject identifier propagation process. The subject identifier propagation process may repeat until all the events under the subject ID are assigned with either an authorized subject ID or an unauthorized subject ID. In case where a non-identified event is determined as noise for example the event could not be reached by a neighboring event search of any identified event (not shown in the present disclosure), the event will remain non-identified.

In this embodiment, the subject identifier propagation process is initiated with identified events 612, 616 and 618. In the first round of subject identifier propagation process, events adjacent to the events 612 such as event 621 may be reached by the neighbouring event search of event 612 and assigned with an authorized subject ID, similarly, events 622 and 623 may be reached by the neighbouring event search of events 616 and 618 respectively and assigned with the unauthorized subject ID. The events with the same assigned ID is then aggregated to form a list of event for example, a list of event relating to the authorized subject comprising events 612 and 621, a list of events relating to the unauthorized subject comprising events 616, 618, 622 and 623. Subsequently, the subject identifier propagation may continue using identified events 612, 616, 618, 621, 622, 623.

In this second round of subject identifier propagation process, events adjacent to the identified events 612, 621, 622 such as events 624, 625 and 626 may be reached by the search and assigned to respective IDs and aggregated into the list of events comprising the identified event. In particular, events 624 and 625 are assigned based on events 621 and 612 respectively the authorized subject ID and added into the list of events relating to the authorized subject; whereas event 626 is assigned based on event 621 the unauthorized subject ID and added into the list of events relating to the unauthorized subject. In this embodiment, there is no non-identified event in the neighbouring event search of events 618 and 623, so further subject identifier propagation process may not be performed for events 618 and 623. Similarly, in the third round of subject identifier propagation, events 627, 628 may be determined to relate to the authorized subject based on identified events 625 and assigned with the authorized subject ID; whereas events 629 may be determined to relate to the unauthorized subject based on identified event 626 and assigned with the unauthorized subject ID. In an embodiment, such subject identifier propagation process can be achieved by executing equation 2 iteratively, which will be described further in the following.

The subject identifier propagation process may end when all events under the subject ID are assigned with the authorized or unauthorized subject ID. At the end of the subject identifier propagation process, it may be resulted with a list of event relating to the authorized subject comprises events 612, 621, 622, 625, 628 and 629 and a list of event relating to the unauthorized subject comprises events 616, 618, 622, 623, 626 and 629. In various embodiments, the list of events relating to the unauthorized subject will then be used to generate an alert indicating the detection of the unauthorized subject.

Advantageously, the present disclosure manages events which do not match with an authorized subject (all events except event 612) and process them with subject identifier propagation process, such that alerts that are not supposed to be generated are reduced. Conventionally, once an event is determined that it does not relate to any authorized subject such as events 621, 624, 625, 627 and 628, the event may be used to generate an alert. In contrast, according to the present disclosure, such events such as events 621, 624, 625, 627 and 628 are managed by determining if they relate to the authorized subject through subject identifier propagation process; as a result, the alerts are not generated.

Figure 8:
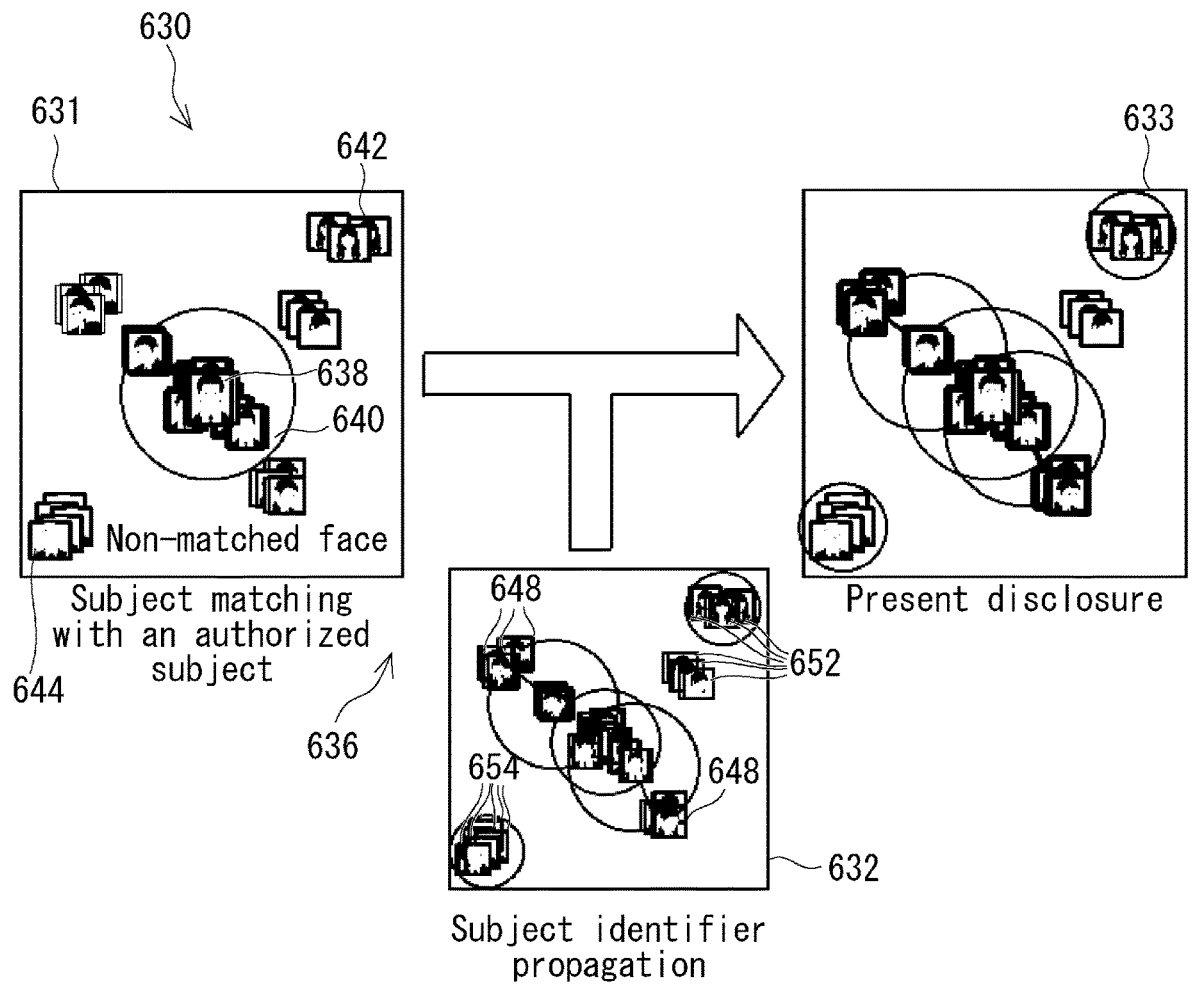
FIG. 8 depicts diagram illustrating an example subject identifier propagation process.

In an embodiment, a density-based spatial clustering of applications with noise (DBSCAN) may be used as the algorithm to achieve the subject identifier propagation described in FIG. 7(c). Specifically, by setting a radius of neighbouring event search, i.e. & (eps) and minimum number of events within the search area, i.e. minPts, the algorithm is configured to construct indexed database for radius of the neighbouring event search, find the neighbouring events and identify an identified event (with authorized subject ID or unauthorized subject ID) within the search area, find the connected components of identified events, ignoring all non-identified events, and assign each non-identified event to a nearby cluster, e.g. a list of identified events, if the cluster comprise a neighbouring event, otherwise assign the non-identified events to noise. FIG. 8 depicts diagram illustrating an example subject identifier propagation process 630. Initially at step 631, a plurality of events may be identified based on an image input during a specific time period with a same subject identifier (subject ID), for example, by online same subject clustering module. Each of the plurality of events is used to match against data identifying each subject of a list of authorized subjects. In this embodiment, it is determined that event 638 relates to an authorized subject 636 of the list of authorized subject and is thus assigned with an authorized subject ID. A circle 640 may be used to represent the second matching threshold, i.e. authorized subject matching threshold, wherein each event which falls inside the circle 640 is determined as having a matching score higher than the authorized subject matching threshold (circle 640) and may be similarly assigned with the authorized subject ID. All events within the circles are aggregated to form a list of events relating to the authorized subject 636. On the other hand, based on a matching score falling below the first matching threshold, events 642 and 644 may be determined to relate to an unauthorized subject and are assigned with an unauthorized subject ID.

The subject identifier propagation is illustrated at step 632, where events adjacent to the identified events have a greater likelihood to be determined to relate to the identified events and assigned with the ID of the identified events in the subject identifier propagation process due to the similarity in data identifying the subject. In particular, events 648 are determined to relate the authorized subject 636, thus they are assigned to the authorized subject ID and are added to the list of events relating to the authorized subject 636. Similarly, the subject identifier propagation process may determine events 652 and 654 to relate to the unauthorized subject due to proximity of data identifying the unauthorized subject, assign the events 652 and 654 with the unauthorized subject ID and add the events 652 and 654 to the list of events relating to the unauthorized subject. At step 633, the list of events relating to the unauthorized subject may be used generate an alert indicating the detection of the unauthorized subject.

Figure 9:
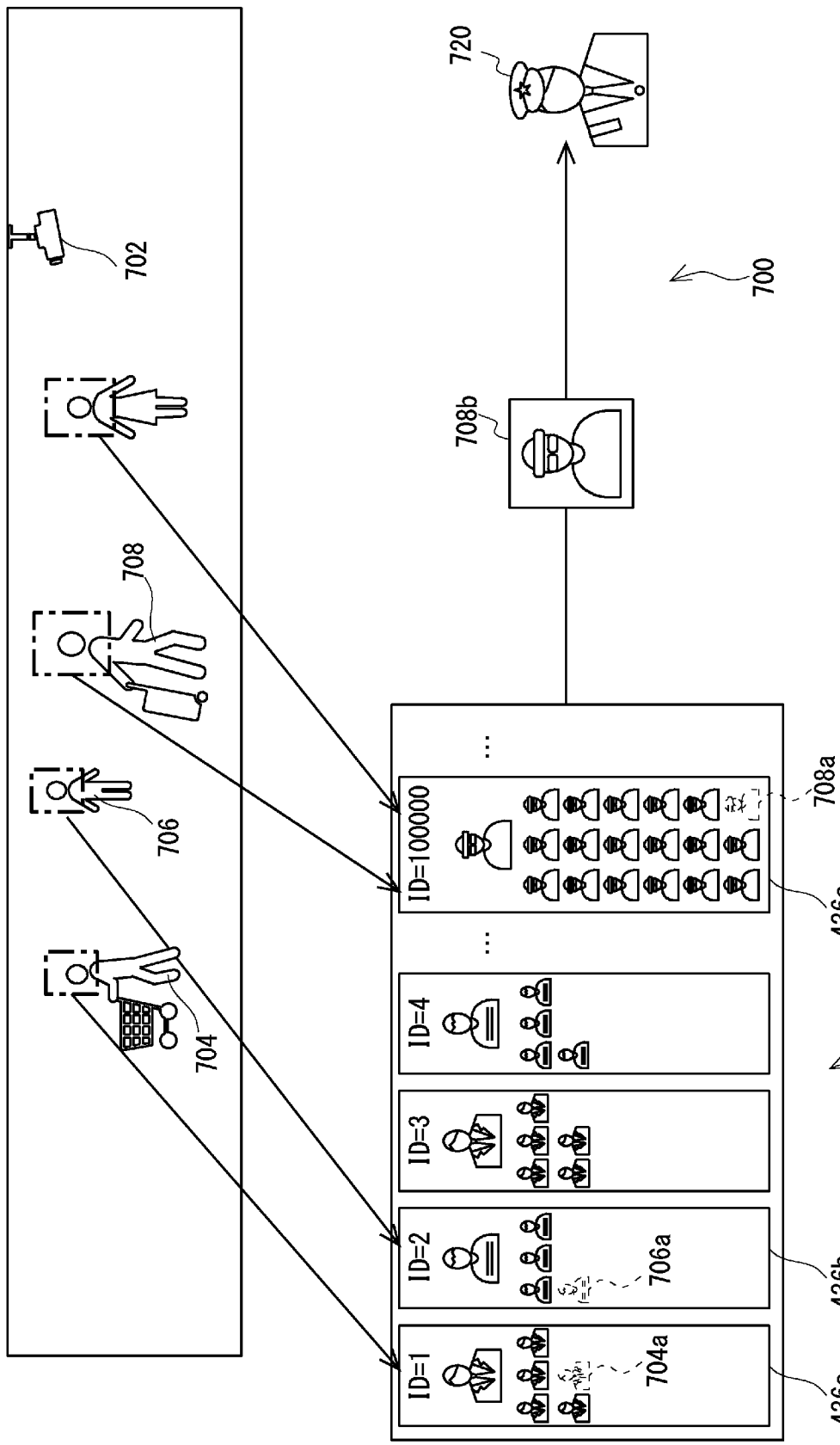
FIG. 9 depicts an example system for determining if an event relates to an unauthorized subject based on an input of an image capturing device.

Various embodiments provide system with portion of the database or the subject identifier repository are used to stored data identifying each subject in the list of authorized or known unauthorized subjects for determining if an event relates to an unauthorized subject. FIG. 9 depicts an example system 700 for determining if an event relates to an unauthorized subject based on an input of an image capturing device 702. The database or the subject identifier repository 436 may be used to store data identifying each authorized subject, e.g. known subject ID 1 to 4 after an event of a subject appearance identified based on the image capturing device 702 is determined to relate to the authorized subject. In particular, appearance of subject 704, 706 may be identified by the image capturing device 702, and an event comprising data identifying the subject 704a, 706a may be determined to relate to an authorized subject, namely known subject IDs 1 and 2 in the database or subject identifier repository 436 respectively. The data identifying the subjects 704a and 706a is then stored in the portion of the database or the subject identifier repository directed to known subject IDs 1 and 2, e.g. 436a and 436b respectively, to update the data identifying the authorized subject for subsequent subject detection and subject identifier propagation process.

In an embodiment, the system 700 may be implemented to include a known unauthorized subject (for example known subject ID 100000) in the list of known subjects stored in the database or subject identifier repository 436 for subject detection and subject identifier propagation process. A known unauthorized subject may be a subject that is identified by an investigator 720 and stored in the memory for crime prevention and investigation. In this embodiment, appearance of subject 708 may be identified by the image capturing device 702, and an event comprising data identifying the subject 708a may be determined to relate to the known authorized subject of known subject ID 100000 in the database or subject identifier repository 436. The event comprising data identifying the subject 708a may also be retrieved by the system and used in subject identifier propagation process, and a list of event 708b with a known unauthorized subject identifier relating to the known unauthorized subject may be determined and used to generate an alert to notify the investigator 720 of the detection of the known unauthorized subject. Similarly, the data identifying the subject 708a is stored in the portion of the database or the subject identifier repository directed to known subject ID 100000, e.g. 436c, to update the data identifying the known unauthorized subject for subsequent subject detection and subject identifier propagation process.

Figure 10:
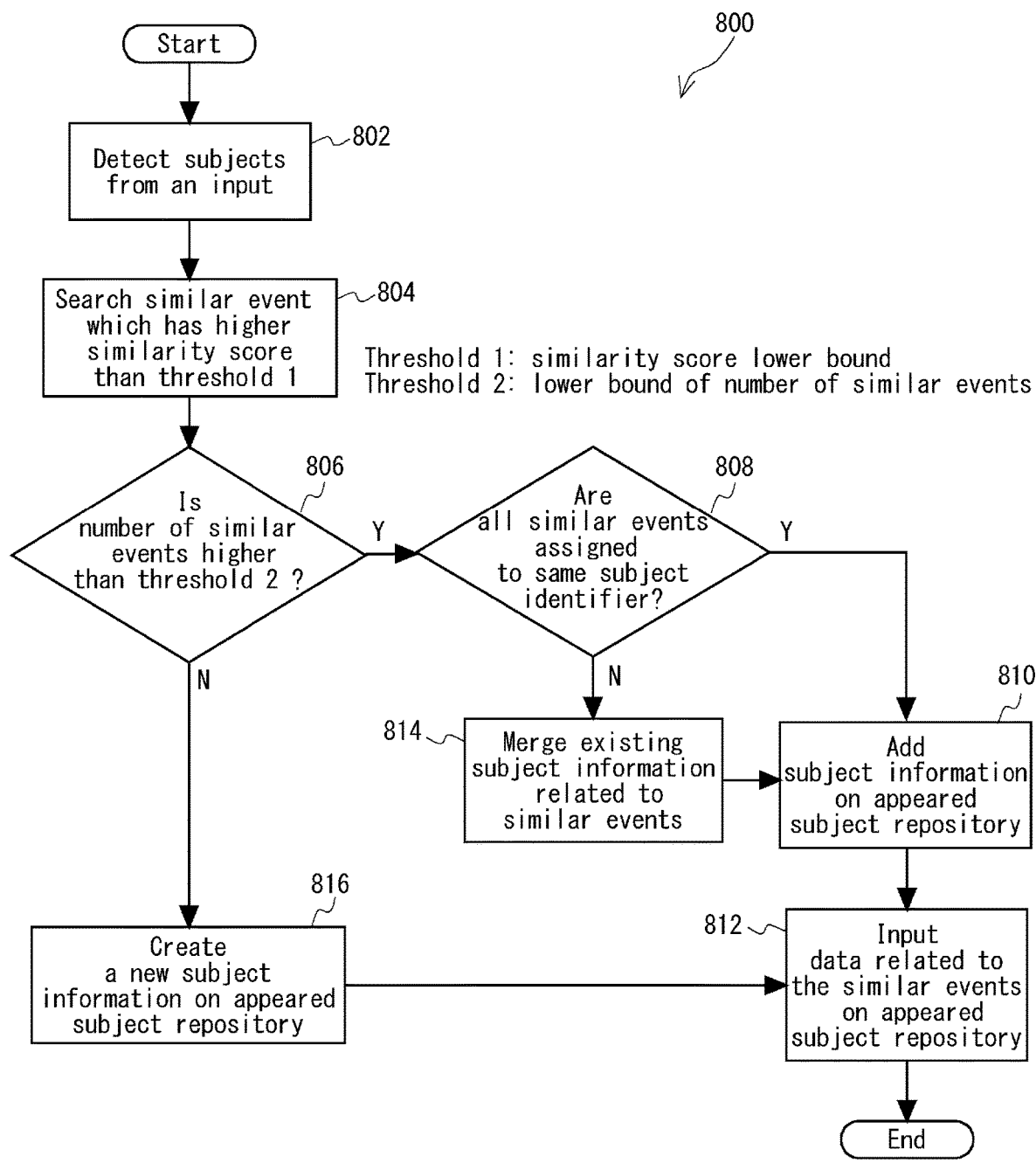
FIG. 10 depicts a flow chart illustrating a process of online same subject clustering according an embodiment.

FIG. 10 depicts a flow chart illustrating a process of online same subject clustering according an embodiment. The process may start at step 802, where appearances of subjects are detected based on an input. An event may be identified for each detected subject appearance. At step 804, the process may undergo a search of similar event, for example based on similar detected subject appearance or data identifying a subject, which has similarity score higher than a similarity score lower bound. At step 806, it is then determined if the number of similar events is higher than a lower bound of number of similar events. If the number of similar events is not higher than the lower bound of number of similar events, step 816 is carried out. At step 816, a new subject information, e.g. subject identifier (subject ID), related to the similar events is created on appeared subject repository. Returning to step 806, if it is determined that the number of similar events is higher than the lower bound of number of similar events, step 808 is carried out. At step 808, it is determined if all similar events are assigned to a same subject ID. If all similar events are assigned to a same subject ID, step 810 is carried out to input the events with the same subject ID to the appeared subject repository. If all similar events are not assigned to a same subject ID, at step 814, the online same subject clustering process will merge existing subject information such that the similar events are assigned to a same subject ID. For example, if one of the similar events has a subject ID of 3 and the rest of the similar events have a subject ID of 1, the similar events may be assigned to subject ID 1 or to a new subject ID 4. This will ensure all similar events will be retrieved collectively for subsequent subject identifier propagation process as shown in FIG. 6. Subsequently, the subject information is added to appeared subject repository at step 810. At step 812, data related to the similar events such as location and time is input and stored in the appeared subject repository, as shown in table 1.

In another embodiment, a subject identifier propagation algorithm may be formulated as a constrained optimization problem into the equation below:

$$F(\{z_i\}) = \Sigma_i \Sigma_j R_{ij}(z_i - z_j)^2 + \lambda \Sigma_i^L (y_i - z_i)^2 \quad \text{Equation (1)}$$

where $y_i$ is identifier score (1 or −1) given as training data, $z_i$ (0<i<N, N is total number of events retrieved at step 602 on FIG. 6) is soft identifier score determined by this algorithm, $R_{ij}$ is similarity score between event data i and event data j, $\lambda$ is the Lagrange multiplier term, L is total number of identified events determined at step 604 in FIG. 6. "$y_i=1$" stands for "event data i is an authorized subject" and "$y_i=-1$" stands for "event data i is an unauthorized subject". The constrained optimization problem defines the objective function expected to be minimized which can be solved by taking the partial derivatives of equation 1 in respect to $\lambda$ and $z_i$, i.e.

$$\frac{\partial F}{\partial \lambda} = 0$$

and $$\frac{\partial F}{\partial z_i} = 0$$

to form equation 2, and running iteratively until $z_i$ converges.

$$z_i = \frac{\sum_j R_{ij} z_j}{\sum_j R_{ij}} (i > L) \quad \text{Equation (2)}$$

$$z_i = y_i (i \leq L) \quad \text{Equation (3)}$$

"$z_i = y_i$" is the constraint for identified events.

Each iteration takes a $O(N^2)$ computation complexity, where N is the input size in units of bits needed to represent the input. By reducing N, the amount of time to run each iteration can be greatly reduced. According to the present disclosure, online same subject clustering may advantageously reduce N and thus the amount of time to run the subject identifier propagation algorithm.

Figure 11:
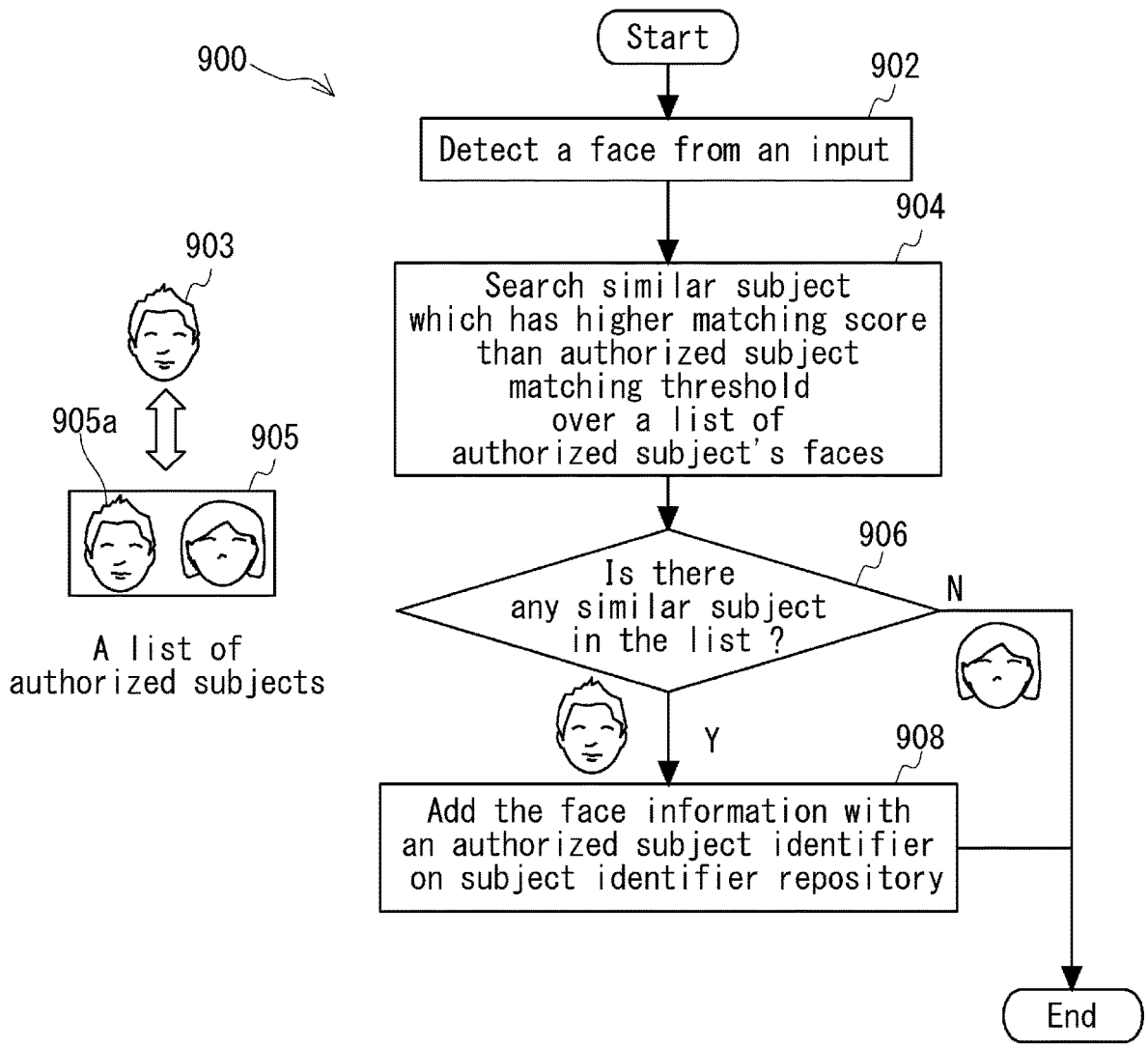
FIG. 11 depicts a flow chart illustrating a process of updating subject identifier repository according to an embodiment.

FIG. 11 depicts a flow chart 900 illustrating a process of updating subject identifier repository according to an embodiment. In this embodiment, facial information is used as data identifying a subject or an unauthorized subject from an image input and comparing against the list of authorized subjects to determine if the event relates to any authorized subject in the list of authorized subjects. At step 902, an event is identified based on a detected face of a subject 903 from an input. At step 904, a search for similar subject over a list of authorized subjects 905 is conducted. The search for similar subject is conducted by comparing the facial information of the event against the facial information of each subject of the list of authorized subjects 905 and calculating a matching score indicating a degree of how the facial information matches each other. A similar subject is detected when the matching score is higher than the second matching threshold, i.e. authorized subject matching threshold. At step 906, it is determined if there is any similar subject in the list of authorized subjects 905. If there is a similar subject, the event comprising the facial information identifying the subject 903 will be assigned with an authorized subject ID corresponding to the similar (authorized) subject. Subsequently, the facial information comprised in the event with the authorized subject ID may be stored in the subject identifier repository to update the facial information of the similar subject 905a for subsequent subject detection and subject identifier propagation process, as illustrated in FIG. 9. In an embodiment, where more than one similar subject in the list of authorized subject are identified, the process may select one similar subject which provides the highest matching score among all identified similar subjects, and the event comprising the facial information identifying the subject will be assigned with an authorized subject ID corresponding to the similar (authorized) subject of the highest matching score. Returning to step 906, if there is no similar subject over the list of authorized subjects, the process may end.

Figure 12:
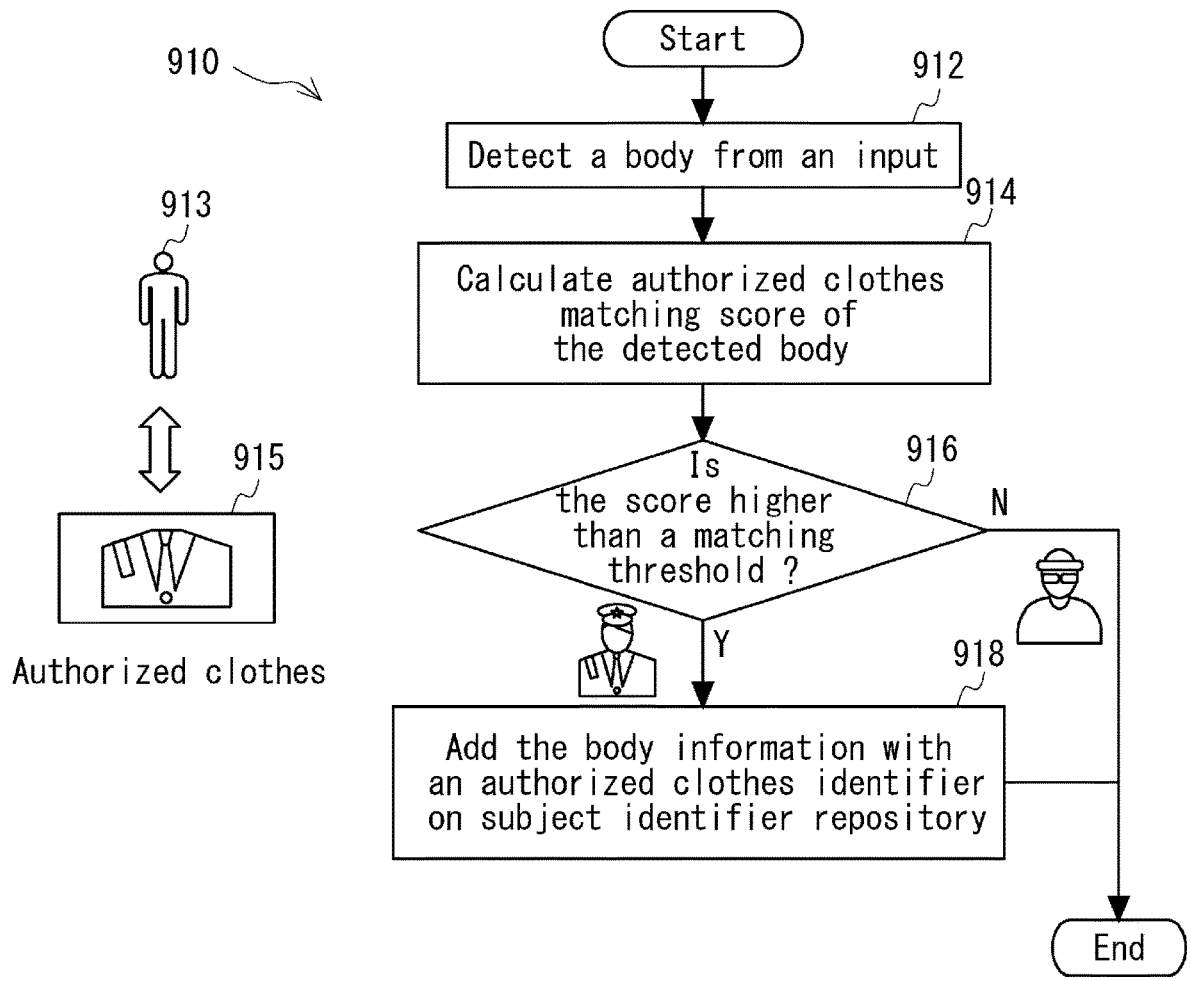
FIG. 12 depicts a flow chart illustrating a process of updating subject identifier repository according to another embodiment.

FIG. 12 depicts a flow chart 910 illustrating a process of updating subject identifier repository according to another embodiment. In this embodiment, a subject 913 may be determined to relate to an authorized subject based on authorized clothes 915, and therefore body information is used as data identifying a subject or an unauthorized subject from an image input to determine if the detected comprises authorized clothes. At step 912, an event of a subject appearance is identified based on a detected body of the subject from an input. At step 914, a matching score is calculated by comparing the body information of the event against the authorized clothes. At step 916, it is determined if the matching score is higher than a matching threshold, for example authorized subject matching threshold. If the matching score is higher than the matching threshold, step 918 is carried out. At step 918, the event is assigned an authorized clothes identifier. Subsequently, the body information comprised in the event with the authorized clothes identifier may be stored in the subject identifier repository to update the body information of the authorized clothes or authorized subject for subsequent subject detection and subject identifier propagation process, as illustrated in FIG. 9. It would appreciate any other body information such as apparel, belongings or even a behavioral characteristic of a subject such as body movement may be used additionally or alternatively in this embodiment as data identifying a subject or determining if an event relate to an authorized subject.

Figure 13:
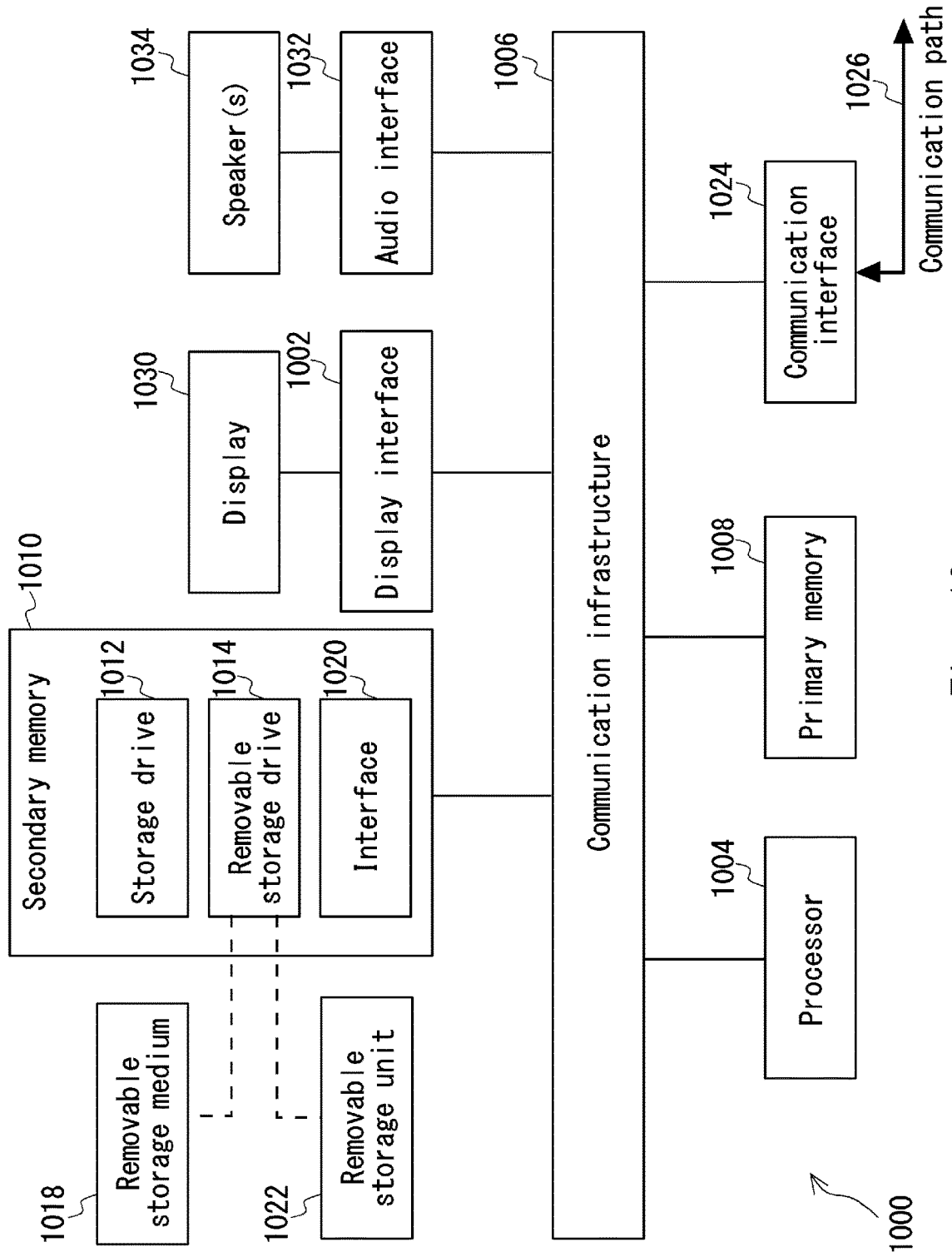
FIG. 13 depicts a schematic diagram of a computer system suitable for use to implement the systems shown in FIGS. 3 and 4.

FIG. 13 depicts an exemplary computing device 1000, hereinafter interchangeably referred to as a computer system 1000 or as a device 1000, where one or more such computing devices 1000 may be used to implement the system 300 shown in FIG. 4. The following description of the computing device 1000 is provided by way of example only and is not intended to be limiting.

As shown in FIG. 13, the example computing device 1000 includes a processor 1004 for executing software routines. Although a single processor is shown for the sake of clarity, the computing device 1000 may also include a multi-processor system. The processor 1004 is connected to a communication infrastructure 1006 for communication with other components of the computing device 1000. The communication infrastructure 1006 may include, for example, a communications bus, cross-bar, or network.

The computing device 1000 further includes a primary memory 1008, such as a random access memory (RAM), and a secondary memory 1010. The secondary memory 1010 may include, for example, a storage drive 1012, which may be a hard disk drive, a solid state drive or a hybrid drive and/or a removable storage drive 1014, which may include a magnetic tape drive, an optical disk drive, a solid state storage drive (such as a USB flash drive, a flash memory device, a solid state drive or a memory card), or the like. The removable storage drive 1014 reads from and/or writes to a removable storage medium 1018 in a well-known manner. The removable storage medium 1018 may include magnetic tape, optical disk, non-volatile memory storage medium, or the like, which is read by and written to by removable storage drive 1014. As will be appreciated by persons skilled in the relevant art(s), the removable storage medium 1018 includes a computer readable storage medium having stored therein computer executable program code instructions and/or data.

In an alternative implementation, the secondary memory 1010 may additionally or alternatively include other similar means for allowing computer programs or other instructions to be loaded into the computing device 1000. Such means can include, for example, a removable storage unit 1022 and an interface 1020. Examples of a removable storage unit 1022 and interface 1020 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1022 and interfaces 1020 which allow software and data to be transferred from the removable storage unit 1022 to the computer system 1000.

The computing device 1000 also includes at least one communication interface 1024. The communication interface 1024 allows software and data to be transferred between computing device 1000 and external devices via a communication path 1026. In various embodiments of the inventions, the communication interface 1024 permits data to be transferred between the computing device 1000 and a data communication network, such as a public data or private data communication network. The communication interface 1024 may be used to exchange data between different computing devices 1000 which such computing devices 1000 form part an interconnected computer network. Examples of a communication interface 1024 can include a modem, a network interface (such as an Ethernet card), a communication port (such as a serial, parallel, printer, GPIB, IEEE 1394, RJ45, USB), an antenna with associated circuitry and the like. The communication interface 1024 may be wired or may be wireless. Software and data transferred via the communication interface 1024 are in the form of signals which can be electronic, electromagnetic, optical or other signals capable of being received by communication interface 1024. These signals are provided to the communication interface via the communication interface 1024.

As shown in FIG. 13, the computing device 1000 further includes a display interface 1002 which performs operations for rendering images to an associated display 1030 and an audio interface 1032 for performing operations for playing audio content via associated speaker(s) 1034.

As used herein, the term "computer program product" (or computer readable medium, which may be a non-transitory computer readable medium) may refer, in part, to removable storage medium 1018, removable storage unit 1022, a hard disk installed in storage drive 1012, or a carrier wave carrying software over communication path 1026 (wireless link or cable) to communication interface 1024. Computer readable storage media (or computer readable media) refers to any non-transitory, non-volatile tangible storage medium that provides recorded instructions and/or data to the computing device 1000 for execution and/or processing.

Examples of such storage media include magnetic tape, CD-ROM, DVD, Blu-ray (registered trademark) Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1000. Examples of transitory or non-tangible computer readable transmission media that may also participate in the provision of software, application programs, instructions and/or data to the computing device 1000 include radio or infra-red transmission channels as well as a network connection to another computer or networked device, and the Internet or Intranets including e-mail transmissions and information recorded on Websites and the like.

The computer programs (also called computer program code) are stored in primary memory 1008 and/or secondary memory 1010. Computer programs can also be received via the communication interface 1024. Such computer programs, when executed, enable the computing device 1000 to perform one or more features of embodiments discussed herein. In various embodiments, the computer programs, when executed, enable the processor 1004 to perform features of the above-described embodiments. Accordingly, such computer programs represent controllers of the computer system 1000.

Software may be stored in a computer program product and loaded into the computing device 1000 using the removable storage drive 1014, the storage drive 1012, or the interface 1020. The computer program product may be a non-transitory computer readable medium. Alternatively, the computer program product may be downloaded to the computer system 1000 over the communications path 1026. The software, when executed by the processor 1004, causes the computing device 1000 to perform functions of embodiments described herein.

It is to be understood that the embodiment of FIG. 13 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts. For example, the primary memory 1008 and/or the secondary memory 1010 may serve(s) as the memory 308 for the apparatus 304; while the processor 1004 may serve as the processor 306 of the apparatus 304.

It will be appreciated by a person skilled in the art that numerous variations and/or modifications may be made to the present invention as shown in the specific embodiments without departing from the spirit or scope of the invention as broadly described. For example, the above description mainly presenting alerts on a visual interface, but it will be appreciated that another type of alert presentation, such as sound alert, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The whole or part of the embodiments disclosed above can be described as, but not limited to, the following supplementary notes.

(Supplementary Note 1)

A method for determining if an event relates to an unauthorized subject, the method comprising:
  determining a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject; and
  determining the event to relate to the unauthorized subject in response to the determination of the likelihood.

(Supplementary Note 2)

The method of Supplementary note 1, further comprising:
  calculating a matching score of each event of the list of events based on data identifying the unauthorized subject, the matching score referring to a degree of correlation between the data identifying the unauthorized subject and data identifying the authorized subject; and
  determining if an event of the list of events relating to the unauthorized subject has a matching score lower than a first matching threshold, the first matching threshold referring to a maximum matching score for an event to be determined as being related to the unauthorized subject, the matching score lower than the first matching threshold indicating that the event of the list of events relates to the unauthorized subject.

(Supplementary Note 3)

The method of Supplementary note 2, further comprising:
  determining if an event of the list of events relating to the authorized subject has a matching score higher than a second matching threshold, the second matching threshold referring to a minimum matching score for an event to be determined as being related to the authorized subject, the matching score higher than the second matching threshold indicating the event of the list of events relates to the authorized subject, wherein the second matching threshold is higher than the first matching threshold.

(Supplementary Note 4)

The method of Supplementary note 3, further comprising:
  calculating a matching score of the event based on data identifying the unauthorized subject; and
  determining if the matching score of the event is higher than the first matching threshold and lower than the second matching threshold, the matching score higher than the first matching threshold and lower than the second matching threshold indicating that the data identifying the unauthorized subject has a moderate degree of correlation with the data identifying the authorized subject.

(Supplementary Note 5)

The method of Supplementary note 1, wherein the step of determining the event to relate to the unauthorized subject comprising:
  determining the event to relate to the authorized subject in response to determining the likelihood of how the event is similar to the at least one event of the list of event relating to the authorized subject higher than the likelihood of how the event is similar to the at least one event of the list of event relating to the unauthorized subject.

(Supplementary Note 6)

The method in any one of Supplementary notes 2 to 5, further comprising:
  updating the data identifying the authorized subject to comprise the data identifying the unauthorized subject of each event of the list of events relating the authorized subject.

(Supplementary Note 7)

The method in any one of Supplementary notes 1 to 6, further comprising:
  receiving an input, the input being at least one image captured by at least one image capturing device during a specific time period, wherein the detection of the event and the list of events comprising the data identifying the unauthorized subject is based on the received input.

(Supplementary Note 8)

An apparatus for determining if an event relates to an unauthorized subject, the apparatus comprising:
  a memory in communication with a processor, the memory storing a computer program recorded therein, the computer program being executable by the processor to cause the apparatus at least to:
    determine a likelihood of how the event is similar to at least one event of a list of events relating to the unauthorized subject, each event of the list of events comprising data identifying the unauthorized subject, the determination of likelihood being based on the data identifying the unauthorized subject; and
    determine the event to relate to the unauthorized subject in response to the determination of the likelihood.

(Supplementary Note 9)

The apparatus of Supplementary note 8, wherein the computer program is executed by the processor to cause the apparatus further to:
  determine a likelihood of how the event is similar to at least one of: (i) at least one event of a list of events relating to the unauthorized subject and (ii) at least one of a list of events relating to an authorized subject, each event of the list of events relating to the authorized subject comprising data identifying the unauthorized subject, the determination of likelihood being based on the data identifying the unauthorized subject.

(Supplementary Note 10)

The apparatus of Supplementary note 9, wherein the computer program is executed by the processor to cause the apparatus further to:
  determine if an event of the list of events relating to the authorized subject has a matching score higher than a second matching threshold, the second matching threshold referring to a minimum matching score for an event to be determined as being related to the authorized subject, the matching score higher than the second matching threshold indicating the event of the list of events relates to the authorized subject, wherein the second matching threshold is higher than a first matching threshold.

(Supplementary Note 11)

The apparatus of Supplementary note 10, wherein the computer program is executed by the processor to cause the apparatus further to:
  calculate a matching score of the event based on data identifying the unauthorized subject; and
  determine if the matching score of the event is higher than the first matching threshold and lower than the second matching threshold, the matching score higher than the first matching threshold and lower than the second matching threshold indicating that the data identifying the unauthorized subject has a moderate degree of correlation with the data identifying the authorized subject.

(Supplementary Note 12)

The apparatus of Supplementary note 8, wherein the computer program is executed by the processor to cause the apparatus further to:
  determine the event to relate to the authorized subject in response to determining the likelihood of how the event is similar to the at least one event of the list of event relating to the authorized subject higher than the likelihood of how the event is similar to the at least one event of the list of event relating to the unauthorized subject.

(Supplementary Note 13)

The apparatus in any one of Supplementary notes 9 to 12, wherein the computer program is executed by the processor to cause the apparatus further to:
  update the data identifying the authorized subject to comprise the data identifying the unauthorized subject of each event of the list of events relating the authorized subject.

(Supplementary Note 14)

The apparatus of any one of Supplementary notes 8 to 13, wherein the computer program is executed by the processor to cause the apparatus further to:
  receive an input, the input being at least one image captured by at least one image capturing device during a specific time period, wherein the detection of the event and the list of events comprising the data identifying the unauthorized subject is based on the received input.

(Supplementary Note 15)

A system for determining if an event relates to an unauthorized subject, the system comprising:
  the apparatus as Supplementary noted in any one of Supplementary notes 8 to 14 and at least one image capturing device.

(Supplementary Note 16)

A non-transitory computer readable medium storing a program for causing a computer to execute:
  determining a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject; and
  determining the event to relate to the unauthorized subject in response to the determination of the likelihood.

It will be appreciated by a person skilled in the art that numerous variations and/or modifications may be made to the present disclosure as shown in the specific embodiments without departing from the spirit or scope of this disclosure as broadly described. The present embodiments are, therefore, to be considered in all respects to be illustrative and not restrictive.

This application is based upon and claims the benefit of priority from Singapore patent application No. 10202000146S filed on 7 Jan. 2020, the disclosure of which is incorporated herein in its entirety by reference.

REFERENCE SIGNS LIST 100 system
101a-101e image
102 list of authorized subjects
102a authorized subject
103 alert
104 no alert
300 system
302 image capturing device
304 apparatus
306 processor
308 memory
310 database
426 subject detection module
428 online same subject clustering module
430 appeared subject repository
432 appeared subject retrieval module
434 subject identifier assigning module
436 subject identifier repository
438 subject identifier propagation module
440 unauthorized subject retrieval module
442 alerts
443 image input
444 search request
612, 616, 618 event
614 circle
621-629 event
636 authorized subject
638 event
640 circle
642, 644, 648, 652, 654 event
700 system
702 image capturing device
704, 704a, 706, 706a, 708, 708a subject
708b event
720 investigator
436a-436c ID
903, 905, 905a subject
913 subject
915 authorized clothes
1000 computing device
1004 processor
1006 communication infrastructure
1008 primary memory
1010 secondary memory
1012 storage drive
1014 removable storage drive
1018 removable storage medium
1020 interface
1022 removable storage unit
1024 communication interface
1026 communication path
1030 display
1032 audio interface
1034 speaker

What is claimed is:

1. A method for determining if an event relates to an unauthorized subject, the method performed by a computer and comprising:
determining a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject;
determining the event to relate to the unauthorized subject in response to the determination of the likelihood;
calculating a matching score of each event of the list of events based on data identifying the unauthorized subject, the matching score referring to a degree of correlation between the data identifying the unauthorized subject and data identifying the authorized subject;
determining if an event of the list of events relating to the unauthorized subject has a matching score lower than a first matching threshold, the first matching threshold referring to a maximum matching score for an event to be determined as being related to the unauthorized subject, the matching score lower than the first matching threshold indicating that the event of the list of events relates to the unauthorized subject;
determining if an event of the list of events relating to the authorized subject has a matching score higher than a second matching threshold, the second matching threshold referring to a minimum matching score for an event to be determined as being related to the authorized subject, the matching score higher than the second matching threshold indicating the event of the list of events relates to the authorized subject, the second matching threshold being higher than the first matching threshold;
calculating a matching score of the event based on data identifying the unauthorized subject; and
determining if the matching score of the event is higher than the first matching threshold and lower than the second matching threshold, the matching score higher than the first matching threshold and lower than the second matching threshold indicating that the data identifying the unauthorized subject has a moderate degree of correlation with the data identifying the authorized subject.

2. The method of claim 1, wherein determining the event to relate to the unauthorized subject comprises:
determining the event to relate to the authorized subject in response to determining that the likelihood of how the event is similar to the at least one event of the list of events relating to the authorized subject is higher than the likelihood of how the event is similar to the at least one event of the list of events relating to the unauthorized subject.

3. The method in claim 1, further comprising:
updating the data identifying the authorized subject to comprise the data identifying the unauthorized subject of each event of the list of events relating to the authorized subject.

4. The method in claim 1, further comprising:
receiving an input, the input being at least one image captured by at least one image capturing device during a specific time period, wherein detection of the event and the list of events comprising the data identifying the unauthorized subject is based on the received input.

5. An apparatus for determining if an event relates to an unauthorized subject, the apparatus comprising:
a processor; and
a memory in communication with the processor and memory storing a computer program that is executable by the processor to cause the apparatus at least to:
determine a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject;
determine the event to relate to the unauthorized subject in response to the determination of the likelihood;
calculate a matching score of each event of the list of events based on data identifying the unauthorized subject, the matching score referring to a degree of correlation between the data identifying the unauthorized subject and data identifying the authorized subject;
determine if an event of the list of events relating to the unauthorized subject has a matching score lower than a first matching threshold, the first matching threshold referring to a maximum matching score for an event to be determined as being related to the unauthorized subject, the matching score lower than the first matching threshold indicating that the event of the list of events relates to the unauthorized subject;
determine if an event of the list of events relating to the authorized subject has a matching score higher than a second matching threshold, the second matching threshold referring to a minimum matching score for an event to be determined as being related to the authorized subject, the matching score higher than the second matching threshold indicating the event of the list of events relates to the authorized subject, the second matching threshold being higher than the first matching threshold;
calculate a matching score of the event based on data identifying the unauthorized subject; and
determine if the matching score of the event is higher than the first matching threshold and lower than the second matching threshold, the matching score higher than the first matching threshold and lower than the second matching threshold indicating that the data identifying the unauthorized subject has a moderate degree of correlation with the data identifying the authorized subject.

6. The apparatus of claim 5, wherein the computer program is executable by the processor to cause the apparatus further to:
determine the event to relate to the authorized subject in response to determining that the likelihood of how the event is similar to the at least one event of the list of events relating to the authorized subject is higher than the likelihood of how the event is similar to the at least one event of the list of events relating to the unauthorized subject.

7. The apparatus in claim 5, wherein the computer program is executed executable by the processor to cause the apparatus further to:
update the data identifying the authorized subject to comprise the data identifying the unauthorized subject of each event of the list of events relating to the authorized subject.

8. The apparatus of claim 5, wherein the computer program is executable by the processor to cause the apparatus further to:
receive an input, the input being at least one image captured by at least one image capturing device during a specific time period, wherein detection of the event and the list of events comprising the data identifying the unauthorized subject is based on the received input.

9. A system for determining if an event relates to an unauthorized subject, the system comprising:
the apparatus as claimed in claim 5 and at least one image capturing device.

10. A non-transitory computer readable medium storing a program executable by a computer to perform processing for determining if an event relates to an unauthorized subject, the processing comprising:
determining a likelihood of how the event is similar to at least one of: (i) at least one event of a list of events relating to the unauthorized subject and (ii) at least one of a list of events relating to an authorized subject, each event of the list of events comprising data identifying the unauthorized subject, the determination of likelihood being based on the data identifying the unauthorized subject;
determining the event to relate to the unauthorized subject in response to the determination of the likelihood;
calculating a matching score of each event of the list of events based on data identifying the unauthorized subject, the matching score referring to a degree of correlation between the data identifying the unauthorized subject and data identifying the authorized subject;
determining if an event of the list of events relating to the unauthorized subject has a matching score lower than a first matching threshold, the first matching threshold referring to a maximum matching score for an event to be determined as being related to the unauthorized subject, the matching score lower than the first matching threshold indicating that the event of the list of events relates to the unauthorized subject;
determining if an event of the list of events relating to the authorized subject has a matching score higher than a second matching threshold, the second matching threshold referring to a minimum matching score for an event to be determined as being related to the authorized subject, the matching score higher than the second matching threshold indicating the event of the list of events relates to the authorized subject, the second matching threshold being higher than the first matching threshold;
calculating a matching score of the event based on data identifying the unauthorized subject; and
determining if the matching score of the event is higher than the first matching threshold and lower than the second matching threshold, the matching score higher than the first matching threshold and lower than the second matching threshold indicating that the data identifying the unauthorized subject has a moderate degree of correlation with the data identifying the authorized subject.

* * * * *